United States Patent
Iwasaki et al.

(10) Patent No.: US 10,218,030 B2
(45) Date of Patent: Feb. 26, 2019

(54) ELECTRODE STRUCTURE, SECONDARY BATTERY, BATTERY PACK AND VEHICLE

(71) Applicant: KABUSHIKI KAISHA TOSHIBA, Minato-ku (JP)

(72) Inventors: Takuya Iwasaki, Uenohara (JP); Tomoko Sugizaki, Kawasaki (JP); Yasuhiro Harada, Isehara (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 167 days.

(21) Appl. No.: 15/443,651

(22) Filed: Feb. 27, 2017

(65) Prior Publication Data
US 2018/0083310 A1 Mar. 22, 2018

(30) Foreign Application Priority Data
Sep. 21, 2016 (JP) .................................. 2016-183632

(51) Int. Cl.
*H01M 10/058* (2010.01)
*H01M 10/0525* (2010.01)
(Continued)

(52) U.S. Cl.
CPC ..... *H01M 10/0525* (2013.01); *B60L 11/1879* (2013.01); *H01M 2/1077* (2013.01); *H01M 2/1083* (2013.01); *H01M 2/166* (2013.01); *H01M 2/1673* (2013.01); *H01M 2/18* (2013.01); *H01M 4/131* (2013.01); *H01M 4/485* (2013.01); *H01M 4/505* (2013.01); *H01M 4/525* (2013.01); *H01M 4/623* (2013.01); *H01M 4/662* (2013.01); *H01M 10/0562* (2013.01); *H01M 10/0563* (2013.01); *H01M 10/0565* (2013.01);
(Continued)

(58) Field of Classification Search
None
See application file for complete search history.

(56) References Cited

U.S. PATENT DOCUMENTS 8,802,269 B2 * 8/2014 Onishi .............. H01M 10/0585
429/139
2004/0202928 A1 10/2004 Miyamoto et al.
(Continued)

FOREIGN PATENT DOCUMENTS

| | | |
|---|---|---|
| EP | 2 854 196 A1 | 4/2015 |
| JP | 9-27343 | 1/1997 |

(Continued)

OTHER PUBLICATIONS

Extended European Search Report dated Jun. 23, 2017 in Patent Application No. 17158088.9.

*Primary Examiner* — Lucas J. O'Donnell
(74) *Attorney, Agent, or Firm* — Oblon, McClelland, Maier & Neustadt, L.L.P.

(57) ABSTRACT

According to one embodiment, an electrode structure is provided. The electrode structure includes a current collector, a separator layer, and an active material layer including a main surface and a first end face other than the main surface. The active material layer covers a first part of at least one surface of the current collector. The separator layer covers the main surface of the active material layer, at least a part of the first end face and second part of the at least one surface of the current collector.

12 Claims, 15 Drawing Sheets

(51) Int. Cl.

| | | |
|---|---|---|
| *H01M 2/10* | (2006.01) | |
| *H01M 2/16* | (2006.01) | |
| *H01M 4/131* | (2010.01) | |
| *H01M 4/525* | (2010.01) | |
| *H01M 4/505* | (2010.01) | |
| *H01M 4/485* | (2010.01) | |
| *H01M 4/62* | (2006.01) | |
| *H01M 4/66* | (2006.01) | |
| *H01M 10/0562* | (2010.01) | |
| *H01M 10/0563* | (2010.01) | |
| *H01M 10/0569* | (2010.01) | |
| *H01M 10/0565* | (2010.01) | |
| *H01M 10/42* | (2006.01) | |
| *B60L 11/18* | (2006.01) | |
| *H01M 2/18* | (2006.01) | |

(52) U.S. Cl.
CPC ..... *H01M 10/0569* (2013.01); *H01M 10/425* (2013.01); *H01M 10/4207* (2013.01); *H01M 2010/4271* (2013.01); *H01M 2220/20* (2013.01); *H01M 2300/002* (2013.01); *H01M 2300/0037* (2013.01); *H01M 2300/0071* (2013.01)

(56) References Cited

U.S. PATENT DOCUMENTS

| | | |
|---|---|---|
| 2008/0268346 A1 | 10/2008 | Inda |
| 2012/0276437 A1 | 11/2012 | Onishi et al. |
| 2012/0295158 A1 | 11/2012 | Tanaka et al. |
| 2014/0079992 A1 | 3/2014 | Tanaka |
| 2014/0255778 A1 | 9/2014 | Huh et al. |
| 2015/0093637 A1 | 4/2015 | Tokuno et al. |

FOREIGN PATENT DOCUMENTS

| | | |
|---|---|---|
| JP | 2006-86102 | 3/2006 |
| JP | 2008-135287 | 6/2008 |
| JP | 2010-32349 | 2/2010 |
| JP | 2012-53987 A | 3/2012 |
| JP | 2015-517189 | 6/2015 |
| JP | 2016-131158 A | 7/2016 |
| KR | 10-2004-0076831 A | 9/2004 |
| KR | 10-2012-0117757 A | 10/2012 |
| WO | WO 2012/164642 A1 | 12/2012 |

* cited by examiner

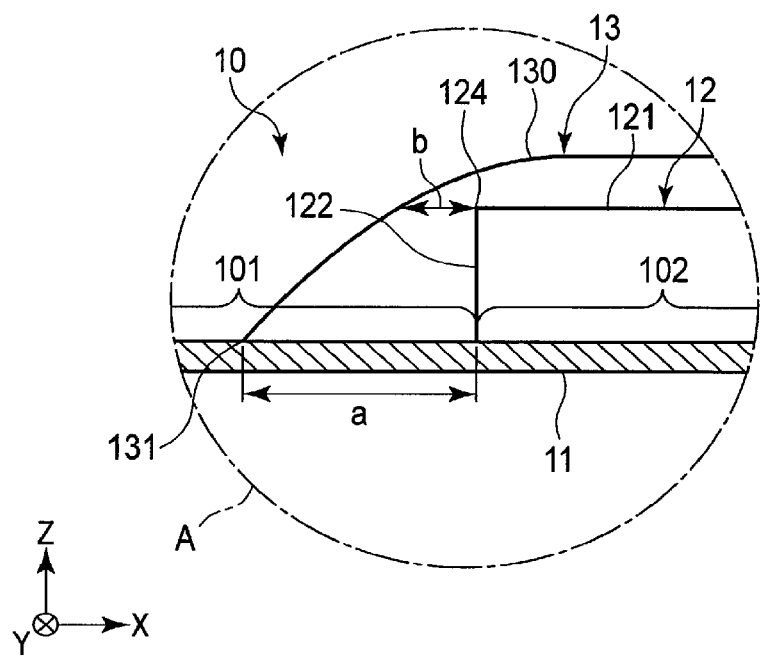
F I G. 3
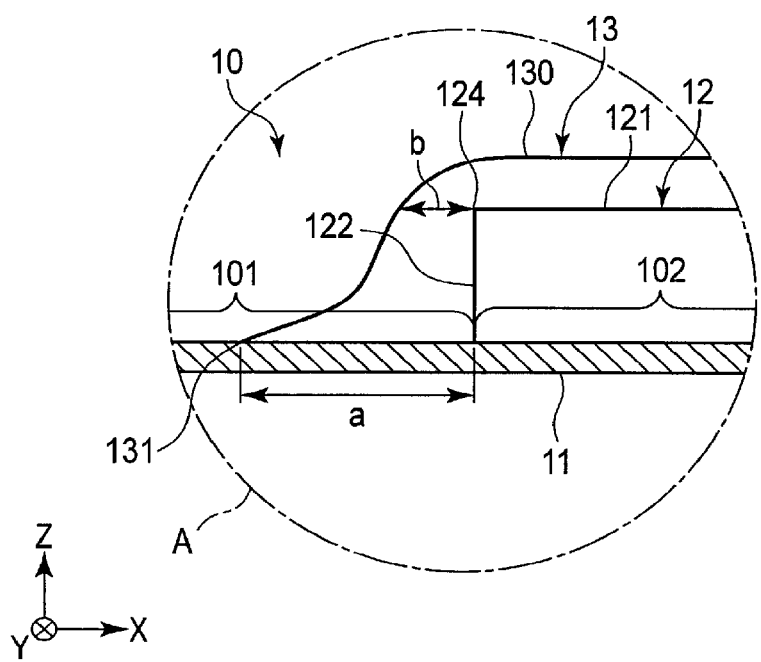
F I G. 4

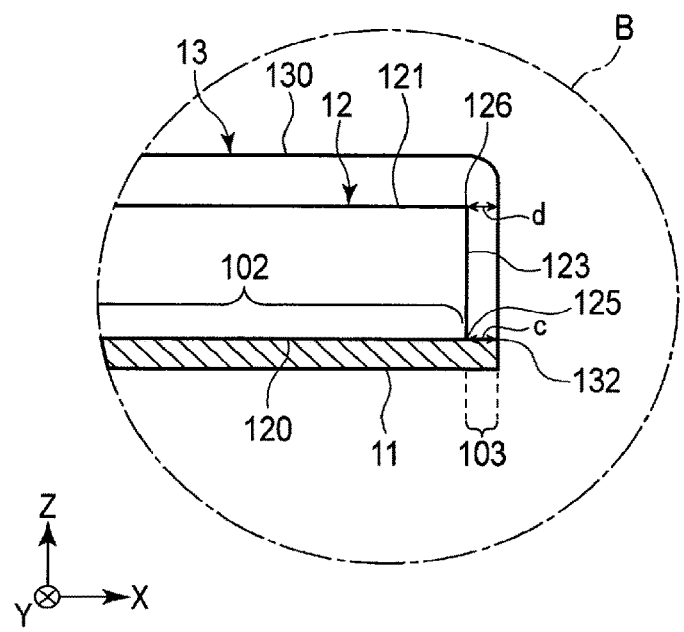
F I G. 5
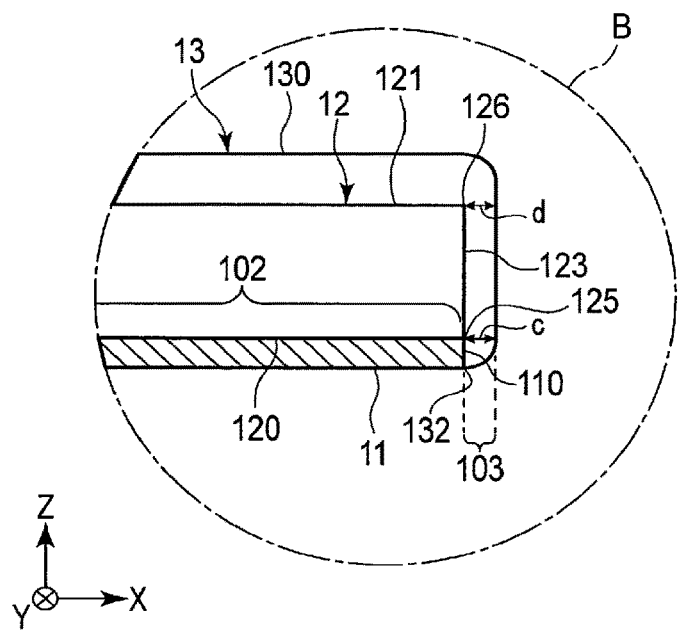
F I G. 6

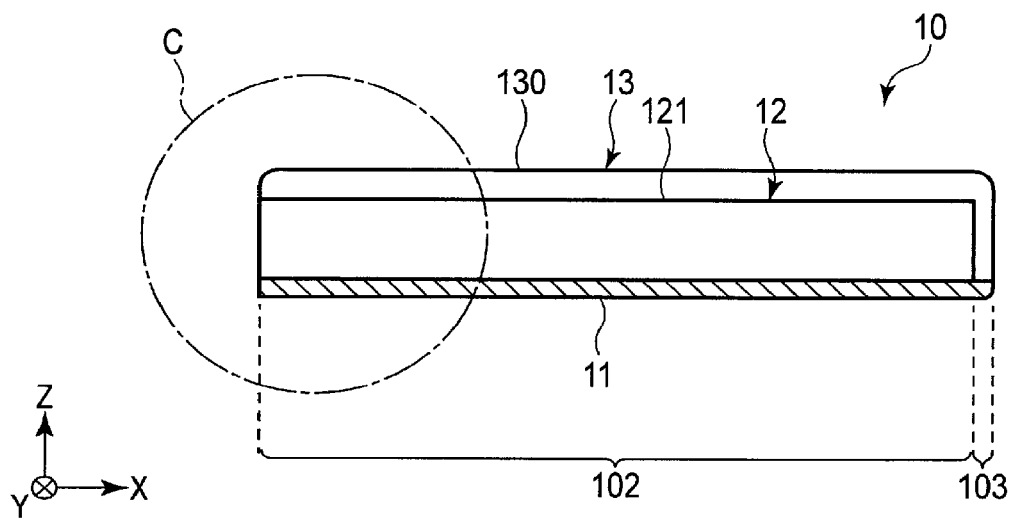
F I G. 7
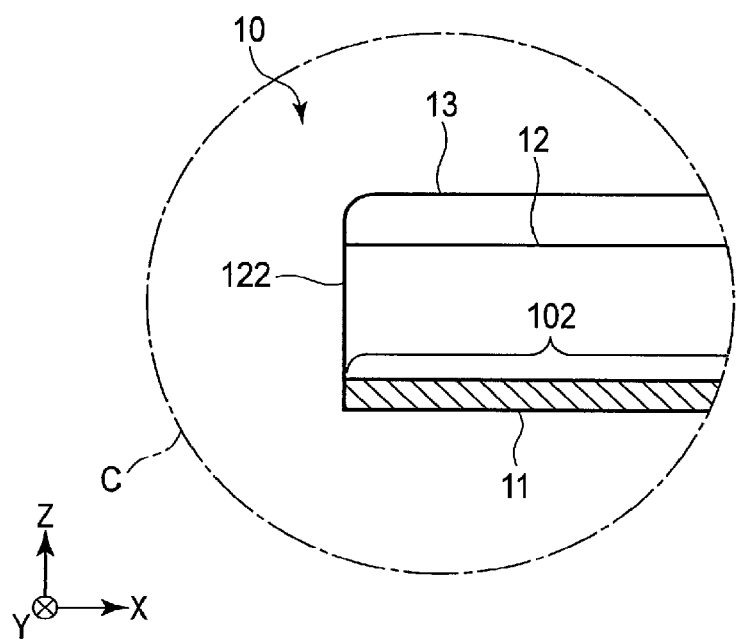
F I G. 8

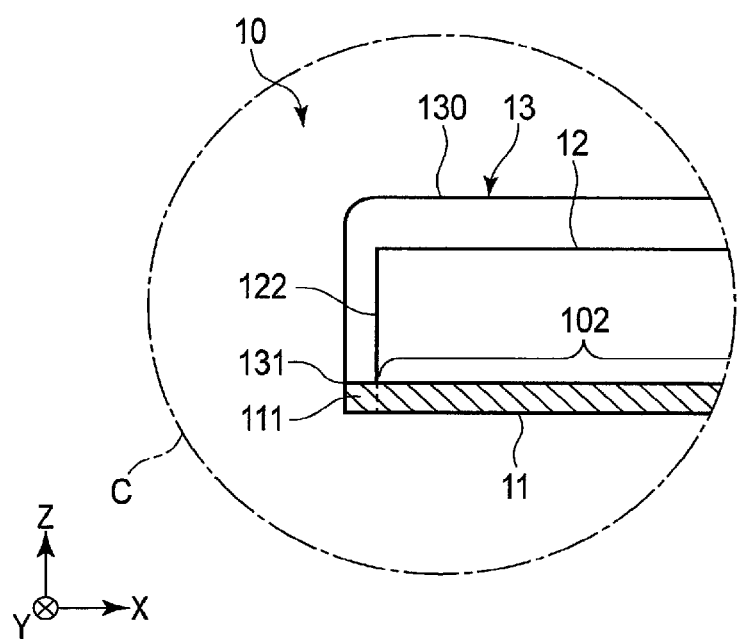
F I G. 9

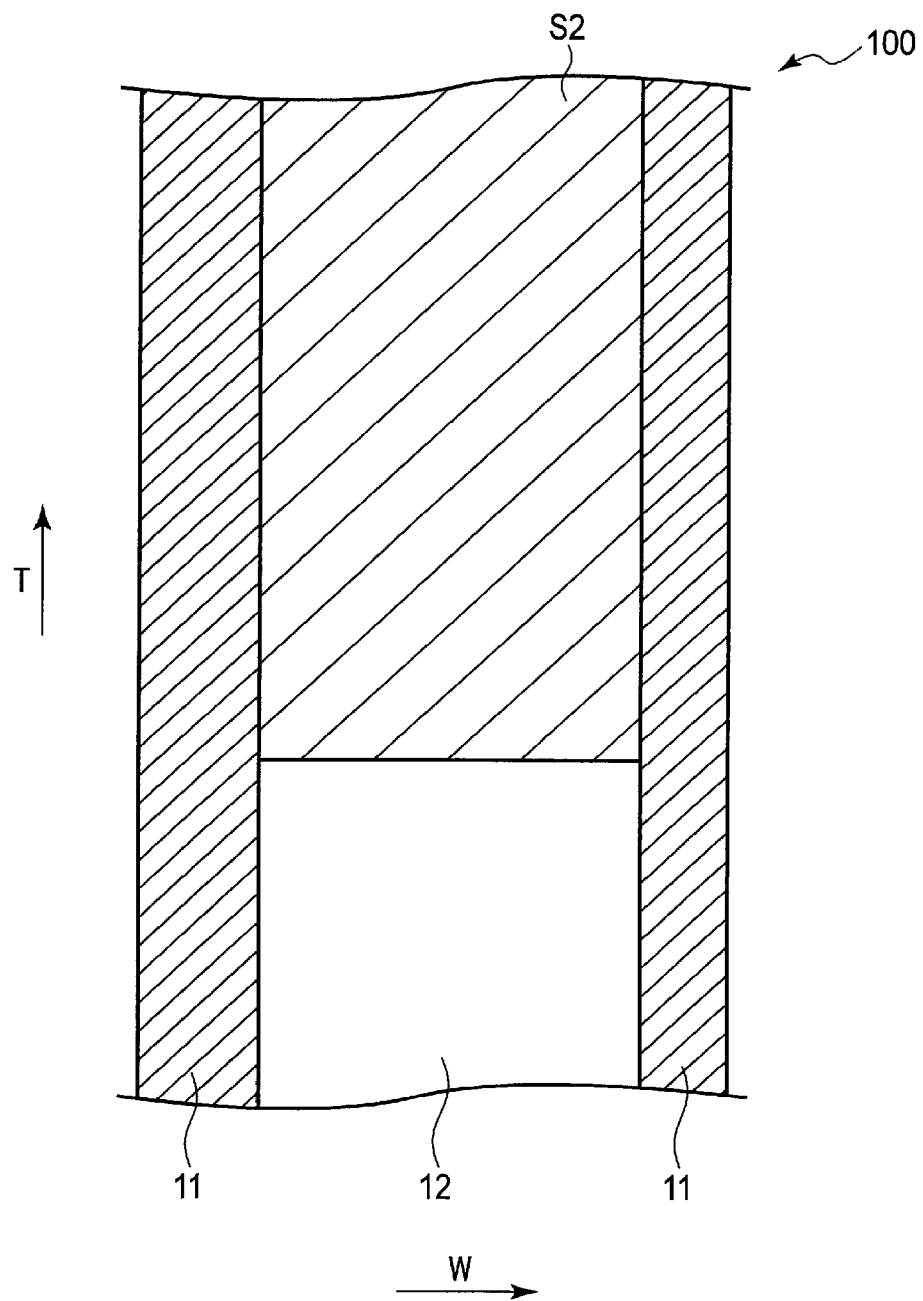
F I G. 11

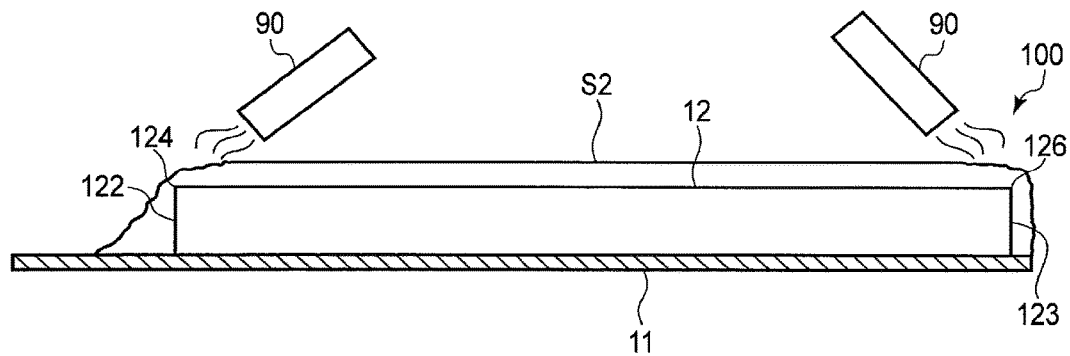
F I G. 12
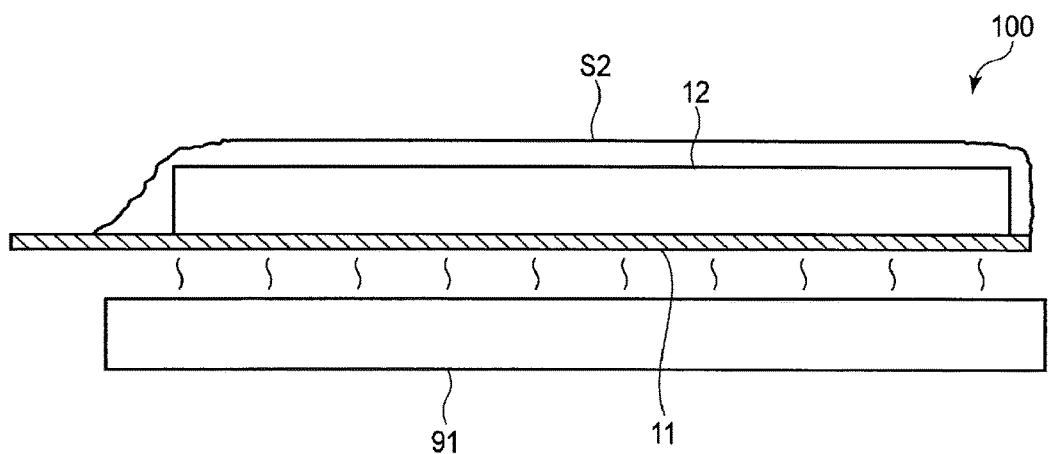
F I G. 13

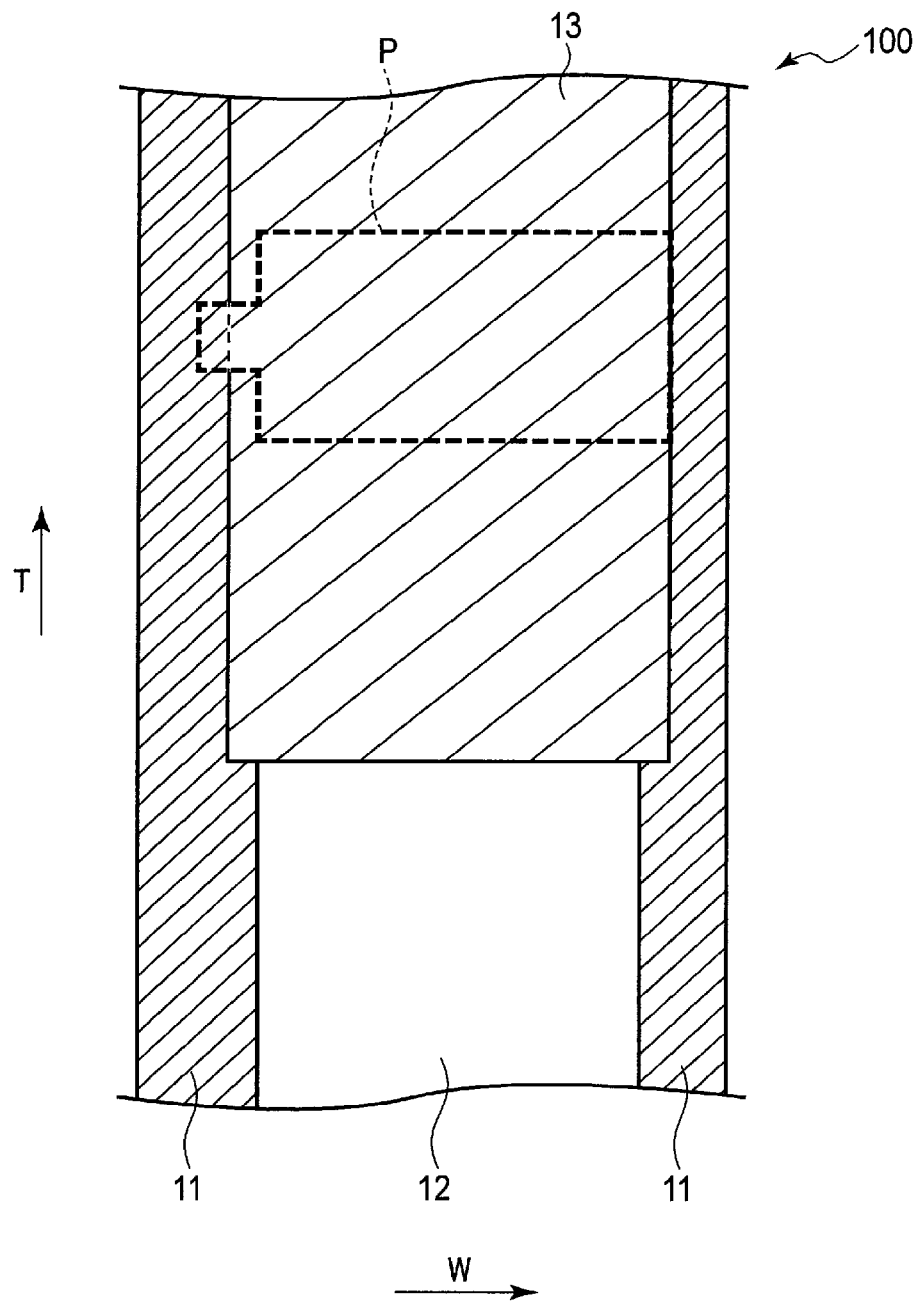
F I G. 14

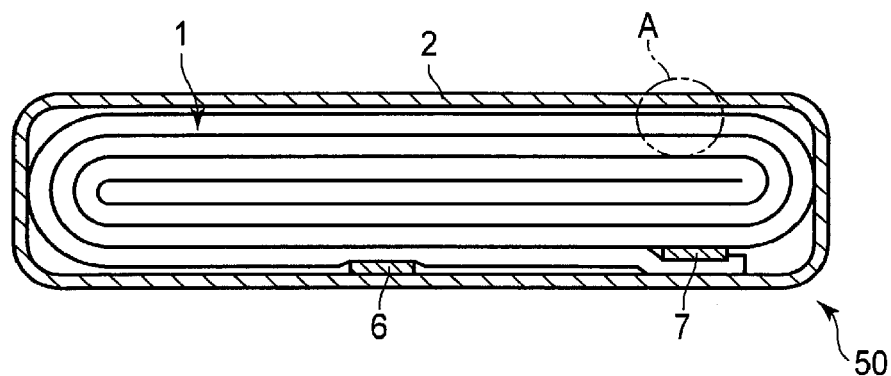
F I G. 15
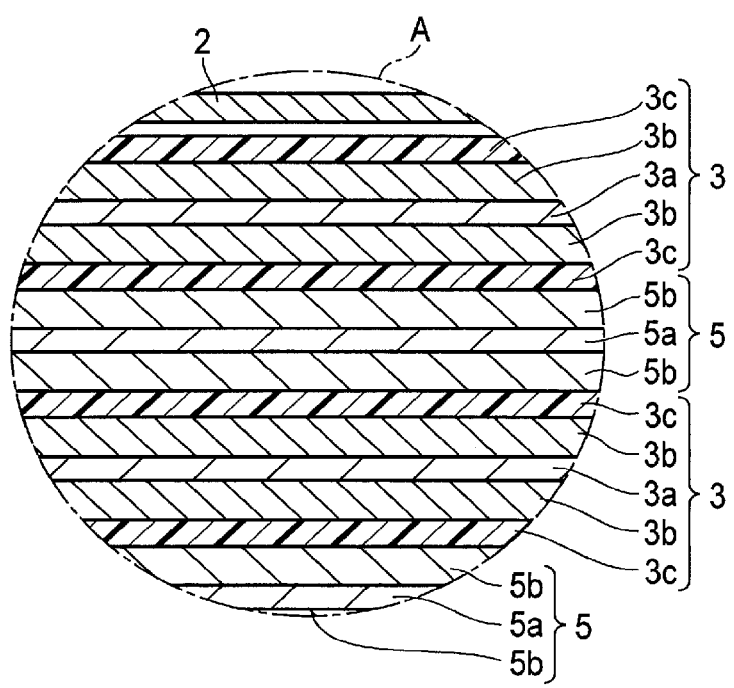
F I G. 16

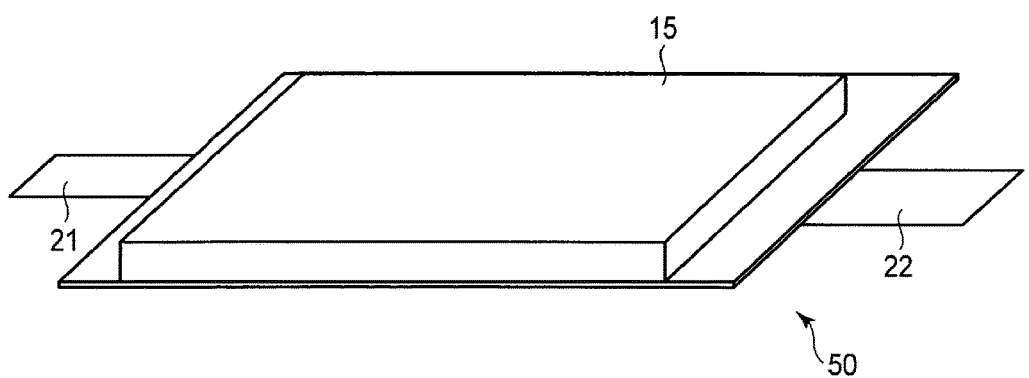
F I G. 17

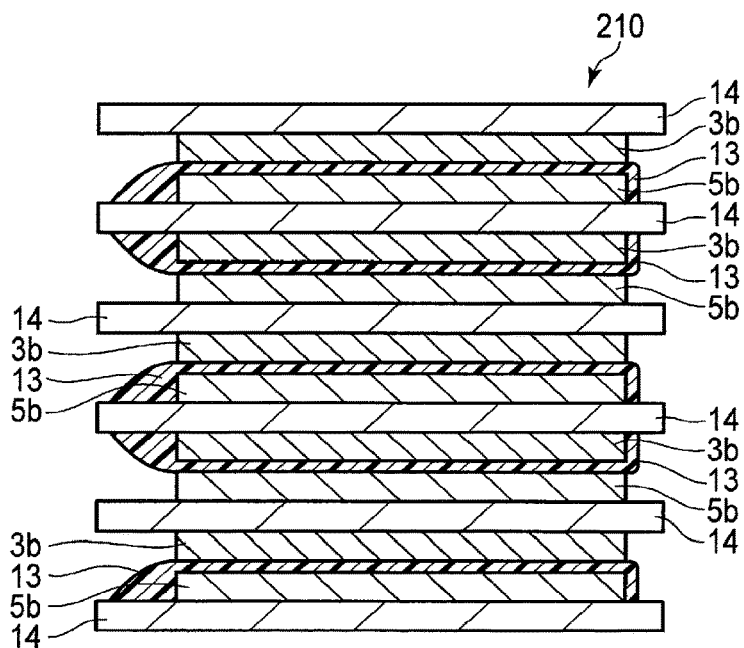
F I G. 19
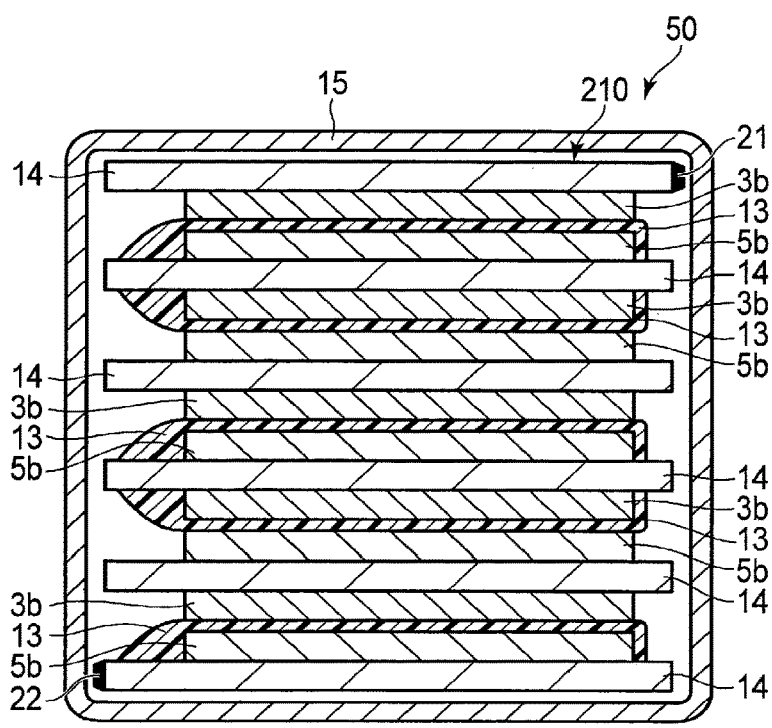
F I G. 20

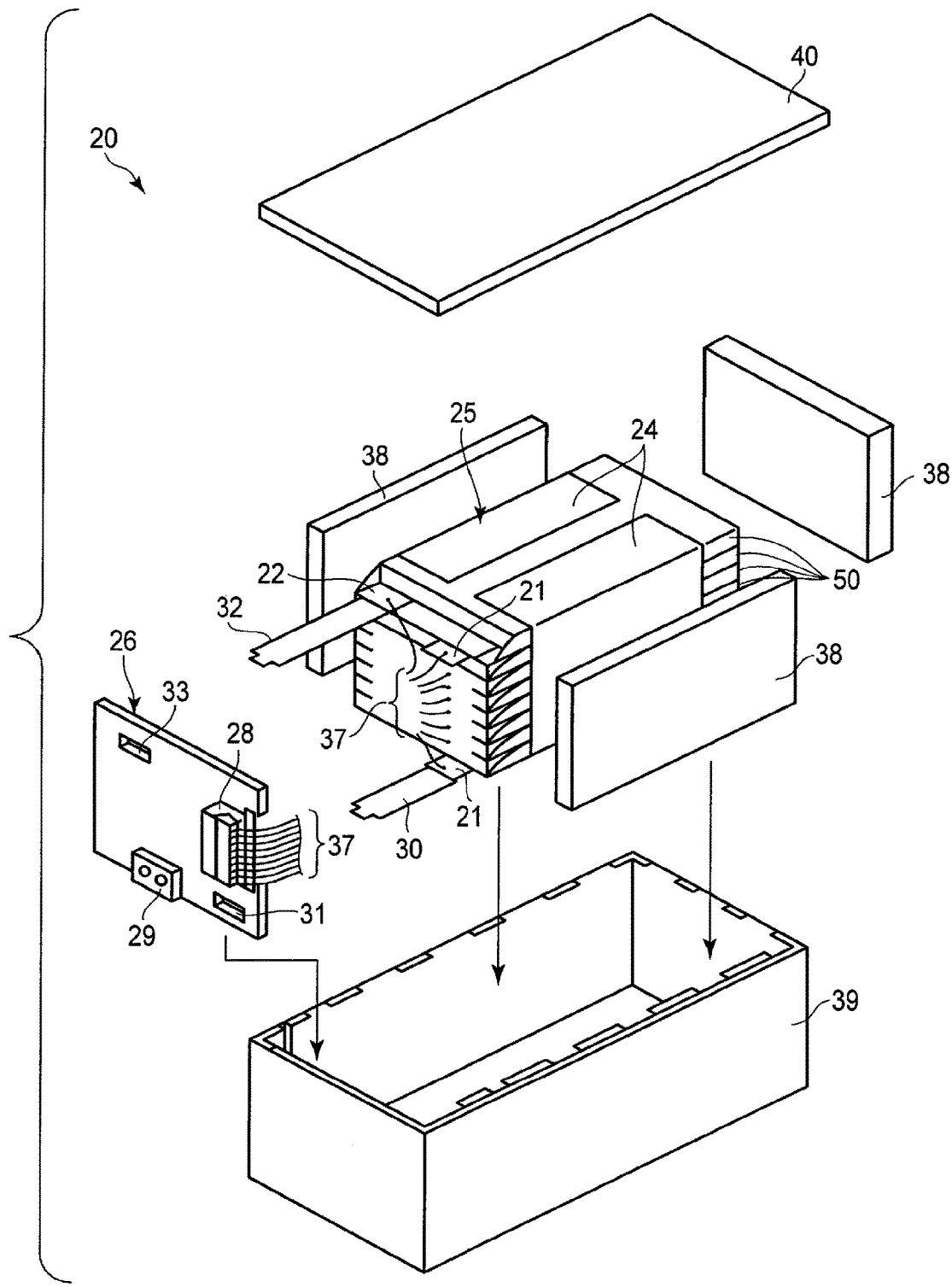
F I G. 21

ELECTRODE STRUCTURE, SECONDARY BATTERY, BATTERY PACK AND VEHICLE

CROSS-REFERENCE TO RELATED APPLICATION

This application is based upon and claims the benefit of priority from Japanese Patent Application No. 2016-183632, filed Sep. 21, 2016, the entire contents of which are incorporated herein by reference.

FIELD

Embodiments of the present invention relate to an electrode structure, a secondary battery, a battery pack, and a vehicle.

BACKGROUND

Nonaqueous electrolyte secondary batteries containing a positive electrode and a negative electrode, which allows lithium ions to be inserted and extracted, have been widely spread in various fields including electric automobiles, power storage systems and information devices as a battery having a high energy density. Accordingly, demands on such batteries have increased, and studies thereof have gathered pace.

In order to use the nonaqueous electrolyte secondary battery for a power source for an electric automobile, it is required that an energy density is high, i.e., a discharge capacity per unit weight or unit volume is large.

On the other hand, the safety becomes an issue as the discharge capacity per unit weight or unit volume becomes larger, and a secondary battery having a more excellent safety is required. One answer to solve the problem described above is an all solid secondary battery. The all solid secondary battery is a secondary battery using a solid electrolyte, literally, instead of an organic electrolytic solution in a nonaqueous electrolyte secondary battery, which has been used up till now. The organic electrolytic solution is flammable, and thus technological developments to improve the safety when the organic electrolytic solution is used are energetically performed. Nevertheless, it is difficult to secure the sufficient safety. The all solid secondary battery does not use the organic electrolytic solution, and thus cannot be ignited. Thus, the all solid secondary battery is a secondary battery having the very high safety.

Further, according to the all solid secondary battery, a bipolar battery can be preferably formed by coating a slurry on an electrode having a bipolar structure, obtained by forming a positive electrode and a negative electrode on both sides of a current collector, to form a solid electrolyte layer and stack it thereon, because the all solid secondary battery does not use the electrolytic solution. In such a bipolar battery, a voltage can be easily increased inside a cell.

BRIEF DESCRIPTION OF THE DRAWING(S)

FIG. 3 is an enlarged cross-sectional view showing a part A in FIG. 2;

FIG. 4 is an enlarged cross-sectional view showing another variation of the part A in FIG. 2;

FIG. 5 is an enlarged cross-sectional view showing a part B in FIG. 2;

FIG. 6 is an enlarged cross-sectional view showing another variation of the part B in FIG. 2;

FIG. 7 is a cross-sectional view along a line VII-VII showing the electrode structure shown in FIG. 1;

FIG. 8 is an enlarged cross-sectional view showing a part C in FIG. 7;

FIG. 9 is an enlarged cross-sectional view showing another variation of the part C in FIG. 7;

FIG. 11 is a plan view showing schematically another step of production steps of an electrode structure according to the first embodiment;

FIG. 12 is a cross-sectional view showing schematically a blowing step of production steps of an electrode structure according to the first embodiment;

FIG. 13 is a cross-sectional view showing schematically a drying step of production steps of an electrode structure according to the first embodiment;

FIG. 14 is a plan view showing schematically another step of production steps of an electrode structure according to the first embodiment;

FIG. 15 is a cross-sectional view showing one example of the secondary batteries according to the second embodiment;

FIG. 16 is an enlarged cross-sectional view showing a part A in FIG. 15;

FIG. 17 is a perspective view showing another example of the secondary batteries according to the second embodiment;

FIG. 19 is a cross-sectional view showing one example of bipolar electrode groups included in a secondary battery according to the second embodiment;

FIG. 20 is a cross-sectional view showing another example of secondary batteries according to the second embodiment;

FIG. 21 is an exploded perspective view showing one example of battery packs according to the third embodiment;

DETAILED DESCRIPTION

Figure 1:
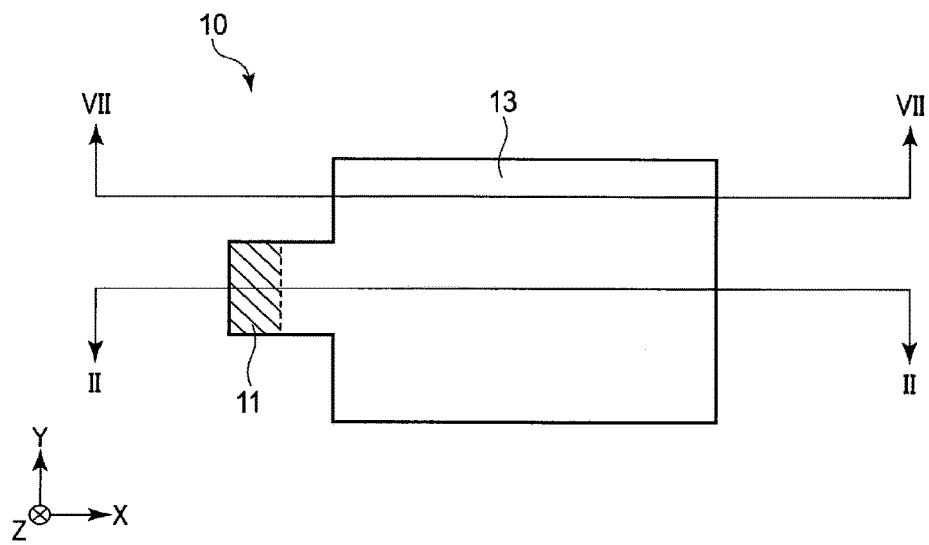
FIG. 1 is a plan view showing schematically one example of electrode structures according to a first embodiment.

According to a first embodiment, an electrode structure is provided. The electrode structure includes a current collector, a separator layer, and an active material layer including a main surface and a first end face other than the main surface. The active material layer covers a first part of at least one surface of the current collector. The separator layer covers the main surface of the active material layer, at least a part of the first end face and second part of the at least one surface of the current collector. The electrode structure satisfies a ratio b/a falling within a range of 0.0001 to 0.5, where a is a distance from the first end face of the active material layer to the first end part of the separator layer, and b is a distance in a direction parallel to the at least one surface of the current collector, which is from a first edge of the active material layer to a surface of the separator layer, the main surface of the active material layer and the first end face of the active material layer intersect at the first edge of the active material layer.

According to a second embodiment, a secondary battery is provided. The secondary battery includes the electrode structure according to the first embodiment.

According to a third embodiment, a battery pack is provided. The battery pack includes a secondary battery according to the second embodiment.

According to a fourth embodiment, a vehicle is provided. The vehicle includes a battery pack according to the third embodiment.

Embodiments are explained below, referring to drawings. The same number is applied to common structures throughout the following embodiments, and overlapped explanations are omitted. In addition, each drawing is a schematic view for encouraging explanations of the embodiment and understanding thereof, and thus there are some details in which a shape, a size and a ratio are different from those in a device actually used, but they can be appropriately design-changed considering the following explanations and known technology.

First Embodiment

According to a first embodiment, an electrode structure is provided. The electrode structure includes a current collector, a separator layer, and an active material layer including a main surface and a first end face other than the main surface. The active material layer covers a first part of at least one surface of the current collector. The separator layer covers the main surface of the active material layer, at least a part of the first end face and second part of the at least one surface of the current collector. The electrode structure includes a current collector, a separator layer, and an active material layer including a main surface and a first end face other than the main surface. The active material layer covers a first part of at least one surface of the current collector. The separator layer covers the main surface of the active material layer, at least a part of the first end face and second part of the at least one surface of the current collector. The electrode structure satisfies a ratio b/a falling within a range of 0.0001 to 0.5, where a is a distance from the first end face of the active material layer to the first end part of the separator layer, and b is a distance in a direction parallel to the at least one surface of the current collector, which is from a first edge of the active material layer to a surface of the separator layer, the main surface of the active material layer and the first end face of the active material layer intersect at the first edge of the active material layer.

When a solid separator layer is provided on an active material layer, which is provided on at least one surface of a current collector in an electrode, the separator layer has been conventionally formed, for example, by coating. An electrode structure containing the active material layer and the separator layer is produced as described below. First, an active material layer is formed on apart of a current collector surface, and a separator layer is formed so that it covers the whole surface of the active material layer and covers an area wider than that of the active material layer. At that time, the current collector includes a part on which any layer is not formed. After that, the resulting laminate is cut by using a mold so as to include the part including the active material layer and the separator layer and the part on which any layer is not formed, whereby the electrode structure is produced.

According to the production method described above, an upper surface of the active material layer is covered with the separator layer, but side surfaces (end faces) of the active material layer are not covered with the separator layer. Thus, when a secondary battery is constructed by laminating the multiple electrode structures, it is highly likely to cause electric short circuit bringing the positive electrode active material layer into contact with the negative electrode active material layer.

In addition, when a number of the electrode structures are laminated, current collecting tabs in the electrode structures are bounded into one. At that time, the current collecting tab part in the current collector is bent, and thus the stress is concentrated on the bent part. As a result, when even one of the multiple current collecting tabs is cut, the electrode structure, in which the tab is cut, is not electrically connected; in other words, a capacity of the battery is reduced linearly with the number of the electrode structures in which the tab is cut. Secondary batteries having a capacity less than a pre-determined value cannot be put on the market as a product.

When the short circuit and the tab breakage, described above, are caused, a yield is reduced. According to the electrode structure of the embodiment, the short circuit and the tab breakage can be inhibited; as a result, the excellent yield can be attained. The electrode structure is explained below referring to the drawings.

Figure 2:
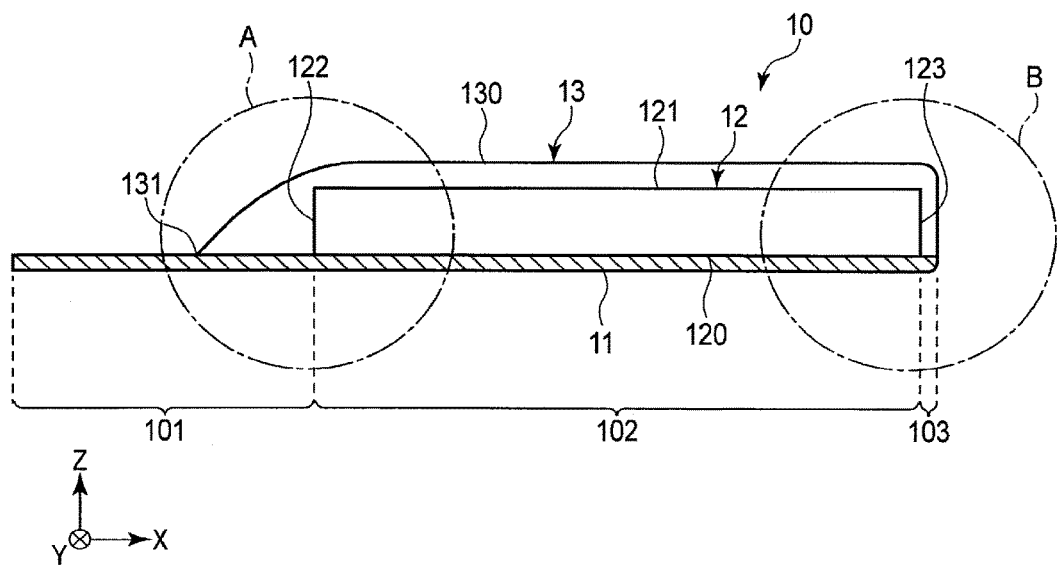
FIG. 2 is a cross-sectional view along a line II-II showing the electrode structure shown in FIG. 1.

FIG. 1 is a plan view showing one example of electrode structures according to a first embodiment. FIG. 2 is a cross-sectional view along a line II-II showing the electrode structure shown in FIG. 1.

In the following descriptions, X-direction and Y-direction are directions parallel to a principal surface of the current collector and crossing each other. The X-direction and the Y-direction are orthogonal to each other. Z-direction is vertical to the X-direction and the Y-direction, i.e., the Z-direction is a thickness direction.

An electrode structure 10 contains a current collector 11, an active material layer 12, and a separator layer 13.

FIG. 1 and FIG. 2 show a state in which the current collector 11 is a foil extending in the X-direction and the Y-direction. The current collector 11 may be a porous body or a mesh. As shown in FIG. 1, the current collector 11 has, for example, a shape in which a part of one edge of four edges of the rectangular foil protrudes in the X-direction. The shape of the current collector 11 is not limited thereto. At least one surface of the current collector 11 supports the active material layer 12 and the separator layer 13. FIG. 1 and FIG. 2 show a case in which one surface of the current collector 11 supports the active material layer 12 and the separator layer 13, as one example. The active material layers 12 and the separator layers 13 may be formed on both sides of the current collector 11.

The electrode structure 10 includes a first section 101 corresponding to the protruding current collector 11, and a second section 102 and a third section 103 corresponding to a remaining part. The first section 101 includes the current collector 11 and the separator layer 13. The second section 102 includes the current collector 11, the active material layer 12, and the separator layer 13. The third section 103 includes the current collector 11 and the separator layer 13. The third section 103 may not contain the current collector 11 as described below.

The active material layer 12 covers apart of the principal surface of the current collector 11. The part of the principal surface of the current collector 11 covered with the active material 12 is sometimes referred to as a first part. A section corresponding to the surface covered by the active material layer 12 in the principal surface of the current collector 11, is defined as the second section 102.

The active material layer 12 may be, for example, a layer in the form of sheet. The active material layer 12 includes a contact surface 120 brought into contact with the current collector 11, and a main surface 121 facing the contact surface 120. The active material layer 12 further includes a first end face 122 located at an interface between the first section 101 and the second section 102, and a second end face 123 facing the first end face 122.

The separator layer 13 covers the main surface 121 of the active material layer 12. The separator layer 13 may cover the whole main surface 121 of the active material layer 12 or apart of the main surface 121. The separator layer 13 covers a part of the first section 101 surface in the principal surface of the current collector 11. In other words, a continuous layer of the separator layer 13 covers the main surface 121 of the active material layer 12, at least apart of the first end face 122 and a second part of the principal surface of the current collector 11 included in the first section 101. As described above, when the separator layer 13 covers the main surface 121 of the active material layer 12 and the principal surface of the current collector 11 so that it strides across the first end face 122 of the active material layer 12, then the first end face 122 of the active material layer 12 is not exposed. For that reason, when such multiple electrode structures are laminated, it is possible to reduce the possibility in which the active material layer is brought into contact with the active material layer included in the other electrode structure; in other words, the possibility in which the short circuit is caused can be reduced, and the excellent yield can be attained.

In the case described above, apart of the first end face 122 of the active material layer 12 may be covered by the separator layer 13, or the whole first end face 122 may be covered by the separator layer 13. FIG. 2 shows a case in which the separator layer 13 covers the whole first end face 122 of the active material layer 12 as one example. The above case is preferable, because the adhesive property between the separator layer 13 and the active material layer 12 is increased and thus it is difficult to peel off the separator layer 13.

The separator layer 13 has a first end part 131 which is located farthest from the active material layer 12 in an area brought into contact with the current collector 11 in the first section 101. The surface 130 of the separator layer 13, which is not brought into contact with the current collector 11 or the active material layer 12, is slanted from a vicinity of the interface between the first section 101 and the second section 102 toward the first end part 131.

The slant of the surface 130 of the separator layer 13 is explained in detailed referring to FIG. 3 and FIG. 4. FIG. 3 is an enlarged cross-sectional view showing a part A in FIG. 2. FIG. 4 is a cross-sectional view showing another variation of the part A in FIG. 2.

In FIG. 3, a shows a distance from the first end face 122 of the active material layer 12 to the first end part 131 of the separator layer 13; and b is a distance in a direction parallel to the principal surface of the current collector 11, which is from a first edge 124 of the active material layer 12 to the surface 130 of the separator layer 13. The main surface 121 of the active material layer 12 intersects the first end face 122 of the active material layer 12 at the first edge 124 of the active material layer. The distance a is longer than the distance b. A ratio of the distance b to the distance a, b/a, is within a range of 0.0001 to 0.5. The ratio of the distance b to the distance a, b/a, is preferably within a range of 0.001 to 0.1.

When the ratio b/a is within a range of 0.0001 to 0.5, it is not easy to break the current collecting tab when, for example, a lot of electrode structures 10 are laminated and the first sections 101, i.e., the current collecting tabs, are bounded. This is caused because the stress applied to the current collector 11, when the current collecting tab is bent, is dispersed by providing the separator layer 13 in the slanted state in the first section 101 of the electrode structure 10. If the separator layer 13 is not provided on the first section 101, the stress, caused by bending the current collecting tab, is concentrated on the edge at which the contact surface 120, brought into contact with the active material layer 12 and the current collector 11, intersects the first end face 122 of the active material layer 12. Then, the stress cannot be dispersed, and thus the current collecting tab is easily broken. When the ratio b/a is less than 0.0001, the electric resistance may be undesirably increased, because the area of the separator layer 13, which covers the principal surface of the current collector 11 in the first section 101, becomes wider, and the separator layer covers the current collector. When the ratio b/a is more than 0.5, it is difficult to disperse the stress of the current collecting tab and the breakage easily occurs.

As described above, the current collector 11 may have the active material layers 12 and the separator layers 13 on the both sides thereof. When the active material layers 12 and the separator layers 13 are provided on the both sides of the current collector 11, it is possible to inhibit the breakage of the current collecting tab, even if the current collecting tab is bent in any direction.

In the separator layer in the embodiment, when the ratio b/a satisfies the values described above, the shape of the slanted surface 130 of the separator layer 13 is not particularly limited. For example, the shape may be a shape in which a thickness in the Z-direction is gradually changed from the second section 102 side to the first section 101 side, as shown in FIG. 3, or may be a sigmoid curve shape, as shown in FIG. 4.

Subsequently, the third section 103 of the electrode structure 10, shown in FIG. 2, is explained referring to FIG. 5. FIG. 5 is an enlarged cross-sectional view showing a part B in FIG. 2.

The third section 103 may or may not include the current collector 11. FIG. 5 depicts a case in which the third section 103 includes the current collector 11. In that case, the current collector 11 supports a part of the separator layer 13 at a position corresponding to the third section 103. It is preferable that a continuous layer of the separator layer 13 covers the surface 121 of the active material layer 12, at least a part of the second end face 123, and a surface corresponding to the third section 103 in the principal surface of the current collector 11. As described above, it is preferable that when the separator layer 13 covers the surface 121 of the active material layer 12 and a third part of the principal surface of the current collector 11 so that it strides across the second end face 123 of the active material layer 12, then the second end face 123 of the active material layer 12 is not exposed. When such multiple electrode structures are laminated, it is possible to reduce the possibility in which the active material layer is brought into contact with the active material layer included in the other electrode structure; in other words, the possibility in which the short circuit is caused can be reduced, and the excellent yield can be attained.

In the case described above, a part of the second end face 123 of the active material layer 12 may be covered by the separator layer 13, or the whole second end face 123 may be covered by the separator layer 13. FIG. 2 and FIG. 5 show a case in which the separator layer 13 covers the whole second end face 123 of the active material layer 12 as one example. The above case is preferable, because the adhesive property between the separator layer 13 and the active material layer 12 is increased and thus it is not easy to peel off the separator layer 13.

The separator layer 13 has a second end part 132 which is located farthest from the active material layer 12 in an area brought into contact with the current collector 11 in the third section 103. The surface 130 of the separator layer 13 may be slanted from a vicinity of the interface between the second section 102 and the third section 103 toward the second end part 132 of the separator layer 13, or may not be slanted. The slant is described in detailed below.

In FIG. 5, c is a distance in a direction parallel to the principal surface of the current collector 11, which is from a second edge 125 of the active material layer 12 to the surface 130 of the separator layer 13. The contact surface 120 of the active material layer 12 and the current collector 11 intersects the second end face 123 of the active material layer 12 at the second edge 125 of the active material layer 12; and d is a distance in a direction to the principal surface of the current collector 11, which is from a third edge 126 of the active material layer 12 to the surface 130 of the separator layer 13 The main surface 121 of the active material layer 12 intersects the second end face 123 of the active material layer 12 at the third edge 126 of the active material layer 12. The distance c may be the same as the distance d, or the distance c may be longer than the distance d. A ratio of the distance d to the distance c, d/c, is, for example, from 0.6 to 1. When the ratio d/c is within a range of 0.6 to 1, the binding property of the separator layer 13 to the second end face 123 of the active material layer 12 is increased, and the binding property of the separator layer 13 to the principal surface or the end face 110 of the current collector 11 is also increased, and thus the effect of improving the insulation reliability is exerted. The ratio of the distance d to the distance c, d/c, is preferably within a range of 0.7 to 0.9.

In FIG. 5 shows a case in which the surface 130 of the separator layer 13 is not slanted in the third section 103, i.e., the distance c is the same as the distance d, as one example.

FIG. 6 is a view showing another variation of the third section 103 of the electrode structure 10.

In the electrode structure 10, shown in FIG. 6, the third section 103 does not include the current collector 11, and only the separator layer 13 exists in the third section 103. In this electrode structure 10, the separator layer 13 covers the surface 121 of the active material layer 12 and covers the end face 110 of the current collector 11 so that it strides across the second end face 123 of the active material layer 12. When the third section 103 does not include the current collector 11, the end face 110 of the current collector 11 is referred to as a third part of the principal surface of the current collector 11. The case described above is preferable, because the second end face 123 of the active material layer 12 is not exposed. The separator layer 13 may cover the whole surface of the end face 110 of the current collector 11, or may covers a part of the end face 110 of the current collector 11.

The electrode structure 10, shown in FIG. 6, has the same structure as in the electrode structure 10 shown in FIG. 5 except for the structure described above.

When the third section 103 has the structure shown in FIG. 5, the short circuit can be further inhibited compares to a case in which the third section 103 has the structure shown in FIG. 6.

The electrode structure 10 may not include the third section 103; in other words, the electrode structure 10 may include only the first section 101 and the second section 102. When the electrode structure 10 does not include the third section 103, second end face 123 of the active material layer 12 is exposed. When the active material layer includes an exposed part, the possibility of occurrence of short circuit is increased when the electrode structures are laminated, and thus it is preferable for the electrode structure 10 to include the third section 103.

The distances a to d, described above, can be measured, for example, by using a scanning electron microscope (SEM) as follows:

First, the electrode structure is taken out from a battery, and the whole structure is fixed using a resin such as an epoxy resin. Next, a portion to be observed is cut using a rotary knife, and then it is polished. After that, the portion is observed using SEM and measurement is performed using a length measurement function of SEM.

At that time, measurement is performed so that the distance a is the minimum length. For example, in a case of the electrode structure 10 shown in FIG. 1, the distance a is decided at a cross-sectional position along the line II-II in the explanation above, but the distance a is changed when the cross-sectional position is moved along the Y-direction. When the distance a in an electrode structure is measured, accordingly, a cross-sectional position is selected so that a distance a is the minimum, and the distance a is measured at the cross-sectional position. The distance b to distance d are measured each at the cross-sectional position.

The cross-sectional views explained referring to FIG. 2 to FIG. 6 show the cross-section of the part including the first section 101, which is the current collecting tab, in the cross-section of the electrode structure 10 along the x-direction shown in FIG. 1. Subsequently, referring to FIG. 7 to FIG. 9, a cross-sectional view at a position in a cross-section containing no first section 101 in the cross-section of the electrode structure 10 along the X-direction shown in FIG. 1.

FIG. 7 is a cross-sectional view along a line VII-VII showing the electrode structure 10 shown in FIG. 1.

FIG. 7 depicts a case in which the electrode structure 10 does not include the first section 101 but includes the second section 102 and the third section 103 at this cross-sectional position.

The cross-section of the electrode structure 10, shown in FIG. 7, has the same structure as in that explained in FIG. 1 to FIG. 6 except that the first section 101 is not contained; in other words, the second section 102 and the third section 103 in the electrode structure 10 has the same structure explained in FIG. 1 to FIG. 6 at the cross-sectional position shown in FIG. 7.

FIG. 8 is an enlarged cross-sectional view showing the C part in FIG. 7. The cross-section of the electrode structure 10 shown in FIG. 7 includes no first section, and thus the first end face 122 of the active material layer 12 is exposed as shown in FIG. 8.

When the first end face 122 of the active material layer 12 is exposed, as described above, the active material layer is brought into contact with an active material layer in another electrode structure, when multiple electrode structures 10 are laminated, whereby the possibility of the occurrence of short circuit is increased. For that reason, it is preferable that the first end face 122 of the active material layer 12 is covered with the separator layer 13. FIG. 9 shows an example in which the first end face 122 of the active material layer 12 is covered with the separator layer 13.

FIG. 9 is an enlarged cross-sectional view showing another variation of the part C in FIG. 7. FIG. 9 depicts a case in which the separator layer 13 covers the first end face 122 of the active material layer 12 at the cross-sectional position in the line VII-VII in FIG. 1. In that case, the current collector 11 includes a section 111 protruding in the X-direction from the first end face 122 of the active material layer 12.

The separator layer 13 covers at least a part of the section 111 described above in the principal surface of the current collector 11; in other words, a continuous layer of the separator layer 13 covers the surface 121 of the active material layer 12, at least a part of the first end face 122 of the active material layer 12, and at least a part of the section 111 described above in the principal surface of the current collector 11. When the separator layer 13 covers the surface 121 of the active material layer 12 and the principal surface of the current collector 11 so that it strides across the first end face 122 of the active material layer 12, as described above, the first end face 122 of the active material layer 12 is not exposed. When such multiple electrode structures are laminated, accordingly, the possibility in which the active material layer is brought into contact with an active material layer included in another electrode structure can be reduced; in other words, the possibility of occurrence of short circuit is reduced, and the excellent yield can be attained.

In that case, a part of the first end face 122 of the active material layer 12 may be covered with the separator layer 13, or the whole first end face 122 may be covered with the separator layer 13. FIG. 9 depicts a case in which the separator layer 13 covers the whole first end face 122 of the active material layer 12 as one example. The above case is preferable, because the adhesive property between the separator layer 13 and the active material layer 12 is increased and thus it is not easy to peel off the separator layer 13.

The separator layer 13 is brought into contact with the principal surface of the current collector 11 on the section 111 of the current collector 11 described above. The surface 130 of the separator layer 13 may be slanted from the second section 102 toward the principal surface of the current collector 11, or may not be slanted.

In the electrode structure 10 shown in FIG. 1, it is preferable that the active material layer 12 is not exposed at the both end parts in the Y-direction. In this case, the possibility of occurrence of short circuit, when the multiple electrode structures are laminated, can be further reduced.

Next, materials and sizes of the current collector, the active material layer and the separator layer included in the electrode structure according to the embodiment are explained.

The current collector may be, for example, a metal foil such as an aluminum foil or an aluminum alloy foil. The aluminum foil or aluminum alloy foil has preferably a thickness of 20 µm or less, more preferably 15 µm or less. When the thickness is within the above range, the weight can be reduced while the strength of the electrode is maintained. The aluminum foil has preferably a purity of 99% by mass. The preferable aluminum alloy contains an element of Mg, Zn, or Si. When the aluminum alloy contains a transition metal such as Fe, Cu, Ni, or Cr, the content thereof is preferably 1% by mass or less.

The active material layer has, for example, a thickness of 5 µm to 100 µm.

When the electrode structure is used as the negative electrode, the active material layer can have, for example, the following structure.

As the negative electrode active material, for example, a compound allowing lithium ions to be inserted therein at a voltage of 0.4 V or more to lithium metal can be used. When such a compound is used, it is possible to inhibit the deposition of the metal lithium on the surface of the electrode. When the discharge is performed at a large current, therefore, it is possible to prevent the occurrence of the internal short circuit. Examples of such a compound may include metal oxides, metal sulfides, metal nitrides, and alloys. As the negative electrode active material, it is possible to use, for example, compounds allowing lithium ions to be inserted therein at a voltage of 3 V (vs. Li/Li$^+$) or less, and it is preferable to use compounds allowing lithium ions to be inserted therein at a voltage of 2 V (vs. Li/Li$^+$) or less.

Examples of the metal oxide may include lithium-titanium oxide, titanium oxide, niobium oxide, niobium-titanium oxide, sodium-niobium-titanium oxide, silicon oxide, and the like.

As the lithium-titanium oxide, it is possible to use, for example, $Li_{4+x}Ti_5O_{12}$ where $-1 \leq x \leq 3$ having a spinel structure; $Li_{2+x}Ti_3O_7$ where $0 \leq x \leq 1$ having a ramsdellite structure; $Li_{1+x}Ti_2O_4$ where $0 \leq x \leq 1$, $Li_{1.1+x}Ti_{1.8}O_4$ where $0 \leq x \leq 1$, $Li_{1.07+x}Ti_{1.86}O_4$ where $0 \leq x \leq 1$, $Li_xTiO_2$ where $0 \leq x \leq 1$, $Li_xM1_{1-y}M2_yTi_{6-z}M3_zO_{14+\delta}$ where M1 is at least one element selected from Sr, Ba, Ca, and Mg, M2 is at least one element selected from Cs, K, and Na, and M3 is at least one element selected from Al, Fe, Zr, Sn, V, Nb, Ta, and Mo, $2 \leq x \leq 6$, $0 \leq y \leq 1$, $0 \leq z \leq 6$, and $-0.5 \leq \delta \leq 0.5$; $Li_{2+w}Na_{2-x}M1_y Ti_{6-z}M2_zO_{14+\delta}$ where M1 is at least one element selected from Cs and K, M2 is at least one element selected from Zr, Sn, V, Nb, Ta, Mo, W, Fe, Co, Mn and Al, $0 \leq w \leq 4$, $0 \leq x \leq 2$, $0 \leq y \leq 2$, $0 \leq z \leq 6$, and $-0.5 \leq \delta \leq 0.5$, or the like. The lithium titanium oxides described above are preferable because their volume change is small upon the insertion and extraction of lithium.

The titanium oxide may include, for example, anatase structure $TiO_2$, monoclinic $TiO_2$ (B), and the like.

The niobium oxide may include, for example, $Nb_2O_5$.

The niobium-titanium oxide may include, for example, $Li_aTiM_bNb_{2\pm\beta}O_{7\pm\sigma}$ where $0 \leq a \leq 5$, $0 \leq b \leq 0.3$, $0 \leq \beta \leq 0.3$, $0 \leq \sigma \leq 0.3$, M is at least one element selected from Fe, V, Mo and Ta, and the like. Specifically, it may include $Nb_2TiO_7$ whose lithium insertion and extraction voltage is nobler than 1.0 V (vs. Li/Li$^+$).

The sodium-niobium-titanium oxide may include, for example, orthorhombic Na-containing niobium titanium composite oxides, represented by the general formula: $Li_{2+v}Na_{2-w}M1_xTi_{6-y-z}Nb_yM2_zO_{14+\delta}$ where $0 \leq v \leq 4$, $0 < w < 2$, $0 \leq x < 2$, $0 < y < 6$, $0 \leq z < 3$, $-0.5 \leq \delta \leq 0.5$, M1 includes at least one element selected from Cs, K, Sr, Ba and Ca, and M2 includes at least one element selected from Zr, Sn, V, Ta, Mo, W, Fe, Co, Mn and Al.

The silicon oxide may include, for example, SiO, Si—SiO composite, and the like.

The metal sulfide may include, for example, $TiS_2$, FeS, $FeS_2$, NiS, $MoS_2$, and the like.

It is possible to use, as the alloy, lithium alloy, silicon alloy, and the like. The lithium alloy preferably contains at least one metal element selected from the group consisting of Si, Al, Zn, Sn and In. Specific examples thereof may include, Li—Al, Li—Bi—Cd, Li—Sn—Cd, and the like. The silicon alloy may include, for example, Si—Sn, Si—Li, and the like.

The negative electrode active materials may be used alone or as a mixture of two or more kinds.

The negative electrode active material is included in the state of a particle in the negative electrode. The negative electrode active material particles may be individual primary particles, secondary particles in which the primary particles are aggregated, or a mixture of individual primary particles and secondary particles. The shape of the particle is not particularly limited, and may be, for example, a spheroidal, elliptical, flat, or fiber shape, and the like.

A conductive agent is added if necessary, in order to increase the current-collecting performance and to suppress the contact resistance between the active material and the current collector. Examples of the conductive agent may include carbonaceous substances including acetylene black, Ketjen black, graphite, and coke. The conductive agent may be used alone or as a mixture of two or more kinds.

A binder has a function to bind the active material, the conductive agent, and the current collector. As the binder, it is possible to use, for example, at least one compound selected from the group consisting of polytetrafluoroethylene (PTFE), polyvinylidene fluoride (PVdF), cellulose members such as sodium carboxymethyl cellulose (CMC), fluororubber, styrene-butadiene rubber, acrylic resin and copolymers thereof, polyacrylic acid, and polyacrylonitrile, the binder being not limited thereto. The binders may be used alone or as a mixture of two or more kinds.

When the binder described above is used, the adhesive property between the current collector and the active material layer is improved, whereby the strength of the electrode can be improved.

The total mass of the acrylic polymer contained in the electrode is preferably within a range of 0.01% by mass to 10% by mass relative to the total mass of the active material. When the content is 0.01% by mass or more, the adhesive property between the current collector and the active material layer can be improved. When the content is 10% by mass, it is not easy to impair the electric conductivity of the electrode.

It is preferable, in the negative electrode active material layer, to add the negative electrode active material, the conductive agent, and the binder, in contents of 82% by weight to 97% by weight of the negative electrode active material, 2% by weight to 18% by weight of the negative electrode conductive agent, and 1% by weight to 16% by weight of the binder. When the content of the conductive agent is less than 2% by weight, the current-collecting performance of the negative electrode active material layer is reduced, and the large current performance of the battery may possibly be reduced. When the content of the binder is less than 1% by weight, the binding property between the negative electrode active material layer and the negative electrode current collector is reduced, and the cycle performance may possibly be reduced. On the other hand, in order to make the capacity higher, it is preferable that the contents of the conductive agent and the binder are respectively 10% by weight or less and 5% by weight or less.

The negative electrode active material layer has preferably a density within a range of 2.0 g/cm³ to 3.0 g/cm³.

When the electrode structure is used as the positive electrode, the active material layer can have, for example, the following structure.

It is possible to use a substance allowing lithium to be inserted and extracted for the positive electrode active material. The positive electrode may contain one kind of the positive electrode active material or may contain two or more kinds of the positive electrode active materials.

Examples of the positive electrode active material may include lithium-manganese composite oxides, lithium-nickel composite oxides, lithium-cobalt-aluminum composite oxides, lithium-nickel-cobalt-manganese composite oxides, spinel lithium-manganese-nickel composite oxides, lithium-manganese-cobalt composite oxides, lithium-iron oxide, lithium-iron fluorinated sulfate, phosphate compounds having an olivine crystal structure (for example, $Li_xFePO_4$ where $0<x\le1$, and $Li_xMnPO_4$ where $0<x\le1$), and the like. The phosphate compound having the olivine crystal structure has the excellent thermal stability.

Examples of the positive electrode active material capable of providing a high positive electrode potential may include lithium manganese composite oxides such as $Li_xMn_2O_4$, where $0<x\le1$, having a spinel structure, and $Li_xMnO_2$ where $0<x\le1$; lithium-nickel-aluminum composite oxides such as $Li_xNi_{1-y}Al_yO_2$ where $0<x\le1$ and $0<y<1$; lithium-cobalt composite oxides such as $Li_xCoO_2$ where $0<x\le1$; lithium nickel cobalt composite oxides such as $Li_xNi_{1-y-z}Co_yMn_zO_2$ where $0<x\le1$, $0<y<1$, and $0\le z<1$; lithium-manganese-cobalt composite oxides such as $Li_xMn_yCo_{1-y}O_2$ where $0<x\le1$ and $0<y<1$; spinel lithium-manganese-nickel composite oxides such as $Li_xMn_{2-y}Ni_yO_4$ where $0<x\le1$, and $0<y<2$; lithium-phosphorus oxides having an olivine structure such as $Li_xFePO_4$ where $0<x\le1$, $Li_xFe_{1-y}Mn_yPO_4$ where $0<x\le1$ and $0\le y\le1$, $Li_xCoPO_4$ where $0<x\le1$; and iron fluorinated sulfate such as $Li_xFeSO_4F$ where $0<x\le1$. The positive electrode active materials may be used alone or as a mixture of two or more kinds.

The positive electrode active material is included in the state of a particle in the positive electrode. The positive electrode active material particles may be individual primary particles, secondary particles in which the primary particles are aggregated, or a mixture of individual primary particles and secondary particles. The shape of the particle is not particularly limited, and may be, for example, a spheroidal, elliptical, flat, or fiber shape, and the like.

A conductive agent is added if necessary, in order to increase the current-collecting performance and to suppress the contact resistance between the active material and the current collector. Examples of the conductive agent may include carbonaceous substances including acetylene black, Ketjen black, graphite, and coke. The conductive agent may be used alone or as a mixture of two or more kinds.

A binder may include, for example, polytetrafluoroethylene (PTFE), polyvinylidene fluoride (PVdF), fluororubber, ethylene-butadiene rubber, polypropylene, (PP), polyetylene (PE), carboxymethyl cellulose (CMC), polyimide (PI), polyacrylimide (PAI), and the like. The binders may be used alone or as a mixture of two or more kinds.

It is preferable, in the positive electrode active material layer, to add the positive electrode active material, the conductive agent, and the binder, in contents of 80% by weight to 95% by weight of the positive electrode active material, 3% by weight to 18% by weight of the conductive agent, and 2% by weight to 17% by weight of the binder. When the content of the conductive agent is 3% by weight or more, the electric conductivity of the positive electrode can be made better, and when it is 18% by weight or less, the decomposition of the electrolyte is reduced on the conductive agent surface. When the content of the binder is 2% by weight or more, the sufficient electrode strength can be obtained, and when it is 17% by weight or less, the insulation part of the electrode can be reduced.

The positive electrode active material layer has preferably a density within a range of 2.5 g/cm³ to 4.0 g/cm³.

The separator layer has, for example, a thickness of 1 μm to 30 μm.

The separator layer contains, for example, an inorganic material, solid electrolyte, and a binder.

As the inorganic material, it is possible to use insulating or dielectric materials. Examples thereof may include titanium oxide, titanium hydroxide, barium titanate, alumina, iron oxide, silicon oxide, aluminum hydroxide, gibbsite, boehmite, bayerite, magnesium oxide, silica, zirconium oxide, magnesium hydroxide, silica, barium titanate, lithium tetraborate, lithium tantalate, mica, silicon nitride, aluminum nitride, zeolite, and the like. The inorganic materials may be used alone or as a mixture of two or more kinds of compounds.

As the solid electrolyte, it is possible to use, for example, inorganic solid particles having Li ion conductivity. The solid electrolytes may be used alone or as a mixture of two or more kinds. As the inorganic solid particle having the Li ion conductivity, it is preferable to use inorganic solid particles having a garnet structure, because it has the high Li ion conductivity, the reduction resistance, and wide electrochemical window. The inorganic solid particles having the garnet structure may include $La_{5+x}A_xLa_{3-x}M_2O_{12}$ where A is at least one element of Ca, Sr and Ba, and M is at least one of Nb and Ta; $Li_3M_{2-x}L_2O_{12}$ where M is at least one of Ta and Nb, and L contains Zr); $Li_{7-3x}Al_xLa_3Zr_3O_{12}$; and $Li_7La_3Zr_2O_{12}$. x is preferably within a range of 0 to 0.5.

Of these, $Li_{6.25}Al_{0.25}La_3Zr_3O_{12}$ and $Li_7La_3Zr_2O_{12}$ are preferable, because they have the high Li ion conductivity (ion conductivity) and are electrochemically stable, and thus they have the excellent discharge performance and cycle life time performance. Further, when the inorganic solid particles having the compositions described above are used as the electrolyte in the nonaqueous electrolytic solution, as described below, even if they are pulverized into fine particles, the resulting particles are chemically stable.

The binder is, for example, at least one compound selected from the group consisting of carboxymethyl cellulose (CMC), hydroxypropylmethyl cellulose (HPMC) cellulose acetate, cellulose ammonium salt, polytetrafluoroethylene (PTFE), polyvinylidene fluoride (PVdF), fluororubber, styrene-butadiene rubber, polyacrylic acid compounds, polyamidoimide, and imide compounds.

When the binder described above is used, the adhesive property between the active material layer and the separator layer can be improved, whereby the strength of the electrode can be improved.

When the solid electrolyte is used for the separator layer, the liquid nonaqueous electrolyte may not be used. However, in order to further improve the ion conductivity, liquid nonaqueous electrolyte containing electrolyte and an organic solvent, or gel nonaqueous electrolyte in which liquid nonaqueous electrolyte is combined with a polymer material may be used. The liquid nonaqueous electrolyte and/or the gel nonaqueous electrolyte can be contained, for example, in the separator layer. When the solid electrolyte is used for the separator layer, it is possible to form a bipolar battery having a small self-discharge.

It is preferable that the liquid nonaqueous electrolyte is dissolved in an organic solvent in a concentration of 0.5 mol/L to 2.5 mol/L.

Examples of the electrolyte may include lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethansulfonate ($LiCF_3SO_3$) and lithium bistrifluoromethylsulfonylimide ($LiN(CF_3SO_2)_2$), and mixtures thereof. The electrolyte which is not easily oxidized even at a high potential is preferable, and $LiPF_6$ is most preferable.

Examples of the organic solvent may include cyclic carbonates such as propylene carbonate (PC), ethylene carbonate (EC), and vinylene carbonate; linear carbonates such as diethyl carbonate (DEC), dimethyl carbonate (DNC), and methylethyl carbonate (MEC); cyclic ethers such as tetrahydrofuran (THF), 2-methyltetrahydrofuran (2MeTHF), and dioxolane (DOX); linear ethers such as dimethoxyethane (DME) and diethoxyethane (DEE); γ-butyrolactone (GEL), acetonitrile (AN), and sulfolane (SL). The organic solvents may be used alone or as a mixed solvent.

Examples of the polymer material include polyvinylidene fluoride (PVdF), polyacrylonitrile (PAN), and polyethylene oxide (PEO).

Alternatively, as the nonaqueous electrolyte, an ambient-temperature molten salt (ionic melt) containing Li ions may be used.

The ambient-temperature molten salt (ionic melt) refers to a compound which can exist as liquid at an ambient temperature (15 to 25° C.) in organic salts in which an organic cation and an organic anion are combined. The ambient-temperature molten salt includes ambient-temperature molten salts which exist as a liquid, ambient-temperature molten salts which turn into liquid by mixing it with electrolyte, and ambient-temperature molten salts which turn into liquid by dissolving it in an organic solvent. The ambient-temperature molten salt, which is generally used in the nonaqueous electrolyte battery, has a melting point of 25° C. or lower. In addition, the organic cation has generally a quaternary ammonium saltskeleton.

The electrode structure according to the embodiment can be produced, for example, as described below.

The method for producing the electrode structure according to the embodiment contains a first coating step in which a first slurry is coated on at least one surface of a current collector;

a first drying step in which the first slurry is dried to form an active material layer;

a second coating step in which a second slurry is coated so as to cover at least a part of the active material layer;

a second drying step in which the second slurry is dried to form a separator layer;

a cutting step in which the current collector, the active material layer, and the separator layer are cut so that a continuous layer of the separator layer includes an area which covers the current collector and the active material layer; and a step in which one or more laminates each including the current collector, the active material layer, and the separator layer are pressed.

The production method further includes a blowing step in which the second slurry is extended so as to cover the surface of the current collector by applying wind to the second slurry between the second coating step and the second drying step.

Referring to FIG. 10 to FIG. 14, the method for producing the electrode structure according to the embodiment is explained below.

Figure 10:
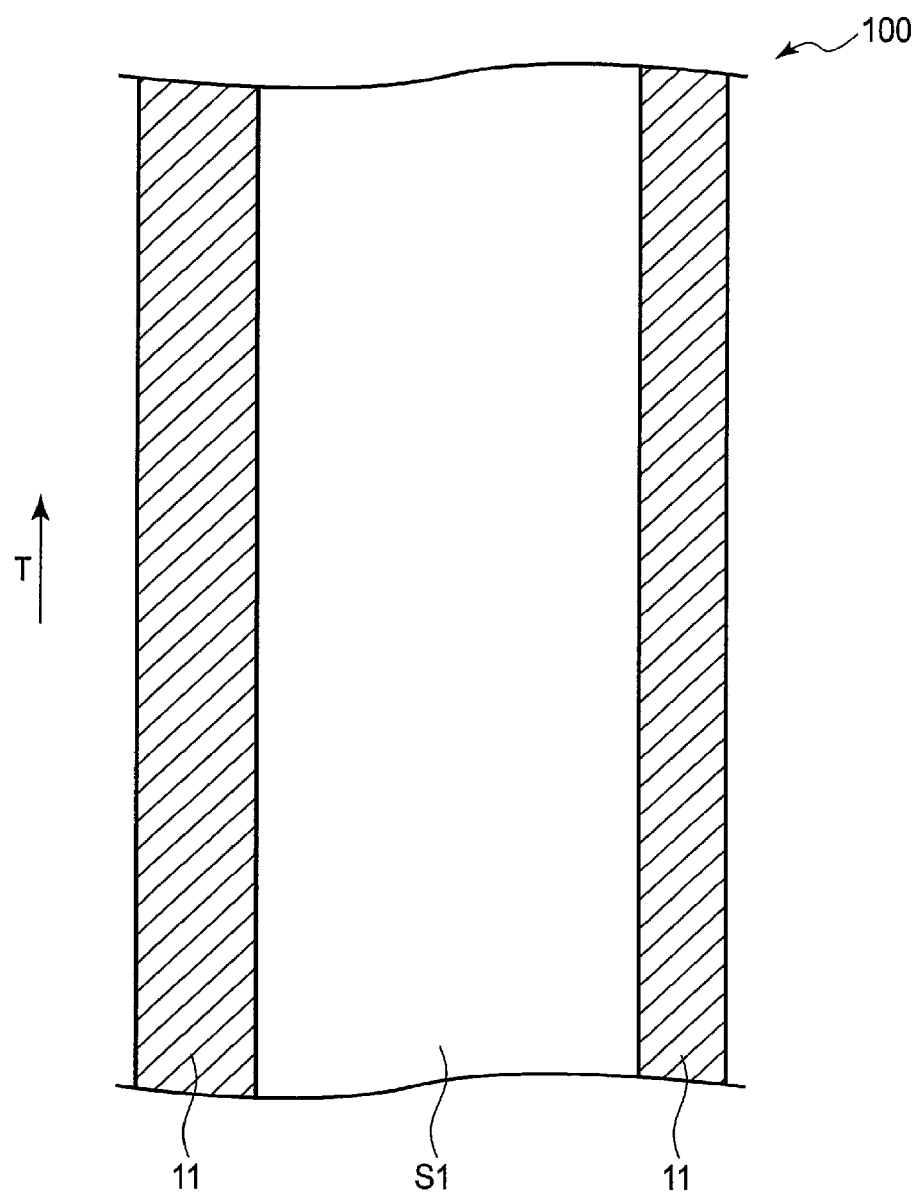
FIG. 10 is a plan view showing schematically one step of production steps of an electrode structure according to the first embodiment.

FIG. 10 is a plan view showing one example of a laminate 100, immediately after a first slurry Si has been coated on the current collector 11.

The current collector 11 is fed, for example, by drawing a foil wound in a rolled state through a current collector feeding apparatus, not shown. In FIG. 10, an end part of the current collector 11 in the transportation direction T is not shown.

A first slurry S1 containing materials of the active material layer is coated on the current collector 11, fed from the current collector feeding apparatus. The first slurry Si can be coated, for example, in a die-coater method. The first slurry may also be coated in a comma coater method, a reverse roll coater method, or the like.

The first slurry S1 is coated along the transportation direction T of the current collector 11. The first slurry S1 is coated so that an area S1 in which the first slurry is coated and an area 11 in which the slurry is not coated are provided on the principal surface of the current collector 11.

The laminate 100 coated with the first slurry S1 is transported to a drying furnace, not shown, and subjected to the first drying step for drying the first slurry S1. The first slurry S1 is dried, whereby an active material layer 12 is formed.

FIG. 11 shows one example of the laminate 100 immediately after a second slurry S2 is coated on the active material layer 12. The second slurry S2 containing materials of the separator layer is coated on the active material layer 12 formed on the principal surface of the current collector 11. The second slurry S2 can be coated, for example, in a gravure method. The second slurry may also be coated in a gravure offset method, a kiss coat method, or the like.

The second slurry S2 is coated along the transportation direction T of the current collector 11. The coated width of the second slurry S2 is, for example, almost the same as the size of the active material layer 12 in the width direction W, formed in the previous step. The second slurry S2 is coated, as shown in FIG. 11, so that an area S2 in which the second slurry is coated and an area 11 in which the slurry is not coated are provided. The width direction W is a direction orthogonal to the transportation direction T.

The laminate 100 coated with the second slurry S2 is transported to the drying furnace again. The laminate 100 is subjected to a blowing step, for example, in the drying furnace. The blowing step may not be performed in the drying furnace. The blowing step is explained referring to FIG. 12 is a cross-sectional view showing schematically one example of the laminate 100 in the blowing step. FIG. 12 shows a state in which second slurry S2, coated on the active material layer 12, is stretched in an in-plane direction.

A blowing nozzle 90 is provided, for example, in the drying furnace. The blowing nozzle 90 is disposed above the surface of the slurry S2. The blowing nozzle 90 is disposed at a position at which wind can be sent toward a first edge 124 and a third edge 126 included in the active material layer 12. The blowing nozzle 90 can appropriately change an air flow, a time to send the wind, an angle of blowing, an area to which the wind is sent, and a distance between the nozzle and the slurry S2, and the like. The second slurry S2, coated on the active material layer 12, can be extended mainly in the blowing direction on the principal surface of the current collector 11 by wind sent from the blowing nozzle 90 to the first edge 124 and the third edge 126. Consequently, the second slurry S2 covers the first end face 122 and the second end face 123 of the active material layer 12. Thus, the second slurry S2 is extended in the in-plane direction; as a result, a continuous layer of the second slurry S2 can cover the surface of the active material layer 12 and a part of the principal surface of the current collector 11.

As described above, the air flow, the time to send the wind, the angle of blowing, the area to which the wind is sent, and the distance between the nozzle and the slurry S2 of the blowing nozzle 90 can be appropriately changed.

Therefore, it is possible to obtain the second slurry S2 having a desired shape by controlling the parameters described above.

After passing through the blowing step in which the shape of the second slurry S2 is controlled, the laminate 100 is subjected to the second drying step. The second drying step is performed, for example, in the same furnace as the drying furnace in which the blowing step has been performed. FIG. 13 is cross-sectional view showing schematically one example of the laminate 100 in the second drying step.

The laminate 100 is dried by warm wind, blown from a warm wind nozzle box 91 provided in the drying furnace. The second slurry S2 is dried in the extended state in the in-plane direction in the second drying step, and a continuous layer of the separator layer 13, which covers the current collector 11 and the active material layer 12, is formed.

In the explanations of the production method described above, the case in which the active material layer 12 and the separator layer 13 are formed on one side of the current collector 11 is described, but they may be formed on both sides of the current collector 11. When they formed on the both sides of the current collector 11, it is possible, for example, to form the active material layer 12 and the separator layer 13 on one side, and then form the active material layer 12 and the separator layer 13 on the other side. Alternatively, the active material layers 12 are formed on the both sides of the current collector 11, and then the separator layers 13 are formed on the active material layers 12.

FIG. 14 is a view showing one example of laminate 100 after the second drying step. The separator layer 13 is passed through the blowing step in the slurry state, whereby it covers the surface of the active material layer 12 and further covers a part of the principal surface of the current collector 11. The laminate 100 is subsequently subjected to the cutting step.

In the cutting step, the laminate 100 is cut, for example, at a cutting position P shown in FIG. 14. The cutting is performed so that the cut laminate 100 contains a continuous layer of the separator layer 13, which covers the current collector 11 and the active material layer 12. The cutting is performed, for example, by using a mold, slitter, or the like.

After the laminate 100 is cut at the cutting position P shown in FIG. 14, the resulting laminate 100 is pressed alone to obtain the electrode structure 10 shown in FIG. 1. The multiple cut laminates may be laminated and the resulting laminate may be pressed.

The electrode structure according to the first embodiment includes a current collector, a separator layer, and an active material layer including a main surface and a first end face other than the main surface. The active material layer covers a first part of at least one surface of the current collector. The separator layer covers the main surface of the active material layer, at least apart of the first end face and second part of the at least one surface of the current collector. The electrode structure satisfies a ratio b/a falling within a range of 0.0001 to 0.5, where a is a distance from the first end face of the active material layer to the first end part of the separator layer, and b is a distance in a direction parallel to the at least one surface of the current collector, which is from a first edge of the active material layer to a surface of the separator layer, the main surface of the active material layer and the first end face of the active material layer intersect at the first edge of the active material layer. As the electrode structure has the structure described above, it is possible to inhibit the short circuit and the breakage of the current collecting tab. As a result, when a secondary battery is formed using the electrode structure, the excellent yield can be attained.

Second Embodiment

According to a second embodiment, a secondary battery is provided. The secondary battery includes the electrode structure according to the first embodiment. The secondary battery includes, for example, the electrode structure as a negative electrode, and a positive electrode. The secondary battery may further include a container material, a positive electrode terminal, and a negative electrode terminal. When the electrode structure is used as the negative electrode or the positive electrode, the current collector and the active material described in the first embodiment can be used.

(Container Member)

As the container member, for example, a laminate film or a metal container may be used.

The shape of the container member may include a flat-type (a thin-type), a square-type, a cylindrical type, a coin-type, a button-type, a sheet-type, laminate-type, and the like. The container member may have a size according to a battery size. The container member has a size used for, for example, a compact battery loaded on a portable electronic device, or a large size battery loaded on vehicles such as two-wheeled to four-wheeled automobiles.

As the laminate film, a multilayer film in which a metal layer is disposed between resin films is used. The laminate film has preferably a thickness of 0.2 mm or less. An aluminum foil or an aluminum alloy foil is preferably used as the metal layer, in order to reduce the weight. As the resin film, it is possible to use a polymer material such as polypropylene (PP), polyethylene (PE), nylon, or polyethylene terephthalate (PET). The laminate film can be sealed by heat seal to form into a shape of the container member sealing the film by heat seal.

The metal container has preferably a thickness of 0.5 mm or less, more preferably 0.2 mm or less.

The metal container is, for example, formed from aluminum, aluminum alloy, or the like. The aluminum alloy preferably contains an element of magnesium, zinc, silicon, or the like. When the alloy contains a transition metal such as iron, copper, nickel, or chromium, the content thereof is preferably adjusted to 100 ppm or less, whereby the long-term reliability in an environment of high temperatures and the heat dissipation can be dramatically improved.

(Positive Electrode Terminal)

The positive electrode terminal can be formed, for example, from a material having a potential within a range of 3 V to 4.5 V relative to lithium (vs $Li/Li^+$) and having the electrical stability and the conductivity. Specifically, the material may include aluminum alloy containing an element of Mg, Ti, Zn, Mn, Fe, Cu, or Si, and aluminum. In order to reduce the contact resistance, it is preferable to use the same material as that of the positive electrode current collector.

(Negative Electrode Terminal)

The negative electrode terminal can be formed, for example, from a material having a potential within a range of 0.4 V to 3 V relative to lithium (vs $Li/Li^+$) and having the electrical stability and the conductivity. Specifically, the material may include aluminum alloy containing an element of Mg, Ti, Zn, Mn, Fe, Cu, or Si, and aluminum. In order to reduce the contact resistance, it is preferable to use the same material as that of the negative electrode current collector.

Next, some examples of the secondary batteries according to the present embodiment are explained, referring to drawings.

First, referring to FIG. 15 and FIG. 16, a flat-type secondary battery, which is one example of the secondary batteries according to the present embodiment, is explained.

FIG. 15 is cross-sectional schematic view showing one example of the flat-type secondary batteries according to the present embodiment. FIG. 16 is an enlarged cross-sectional view showing a part of A in FIG. 15.

The secondary battery 50, shown in FIG. 15 and FIG. 16, includes a flat wound electrode group 1.

The flat wound electrode group 1, as shown in FIG. 16, includes negative electrodes 3 and positive electrodes 5, as the electrode structure. Such a flat wound electrode group 1 can be formed by spirally winding a laminate formed by laminating the negative electrode 3 and the positive electrode 5, the negative electrode 3 being arranged outward, as shown in FIG. 16, and subjecting the resulting wound laminate to press molding.

The negative electrode 3 includes a negative electrode current collector 3a, negative electrode active material layers 3b, and negative electrode separator layers 3c. In this electrode, the negative electrode active material layers 3b and the negative electrode separator layers 3c are formed on the both sides of the negative electrode current collector 3a in this order. The positive electrode 5 includes a positive electrode current collector 5a, and positive electrode active material layers 5b. The positive electrode active material layers 5b are formed on the both sides of the positive electrode current collector 5a.

As shown in FIG. 15 and FIG. 16, in vicinity of an external peripheral end of the wound electrode group 1, a negative electrode terminal 6 is connected to a negative electrode current collector 3a on the outermost negative electrode 3, and a positive electrode terminal 7 is connected to a positive electrode current collector 5a of the positive electrode 5.

The wound electrode group 1 is housed in a bag-shaped container 2 formed from a laminate film in which a metal layer is disposed between two resin layers.

The negative electrode terminal 6 and the positive electrode terminal 7 are extended outward from an opening of the bag-shaped container 2. For example, liquid nonaqueous electrolyte is housed in the bag-shaped container 2. The liquid nonaqueous electrolyte can be injected from the opening of the bag-shaped container 2.

The negative electrode terminal 6 and the positive electrode terminal 7 are disposed in the opening of the bag-shaped container 2, which is heat-sealed, whereby the wound electrode group 1 and the liquid nonaqueous electrolyte are completely sealed.

Figure 18:
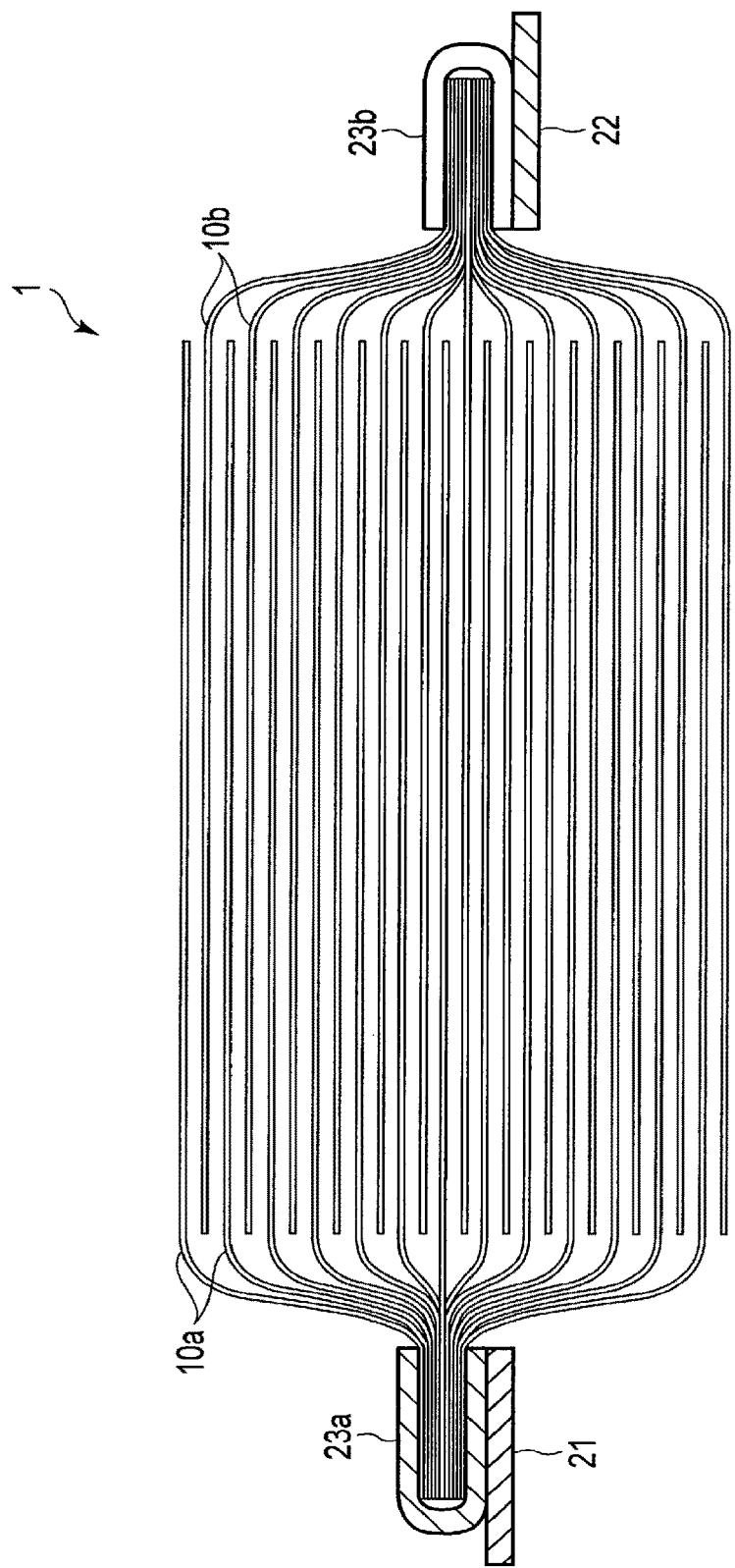
FIG. 18 is a cross-sectional view showing one example of laminated electrode groups included in the secondary battery shown in FIG. 17.

Next, referring to FIG. 17 and FIG. 18, one example of laminate secondary batteries according to the present embodiment is explained.

FIG. 17 is a perspective view schematically showing another example of the secondary batteries according to the present embodiment. FIG. 18 is a schematic view showing a laminated electrode group 1 included in the secondary battery in FIG. 17.

The secondary battery 50, shown in FIG. 17 and FIG. 18, includes a laminated electrode group 1. The laminated electrode group 1 is housed in a container member 12 formed from a laminate film in which a metal layer is disposed between two resin films. As shown in FIG. 18, the laminated electrode group 1 has a structure in which positive electrodes 10a and negative electrodes 10b are alternately laminated. In this structure, there are multiple positive electrodes 10a, and each thereof includes a positive electrode current collector and positive electrode active material layers supported on both sides of the positive electrode current collector. There are multiple negative electrodes 10b as the electrode structure. Each negative electrode 10b includes a negative electrode current collector, negative electrode active material layers, and negative electrode separator layers. The negative electrode active material layers and the negative electrode separator layers are supported on both sides of the negative electrode current collector in this order.

Current collecting tabs of the multiple positive electrodes 10a are bounded into one by ultrasonic welding, which is held on a holding member 23a. Current collecting tabs of the multiple negative electrodes 10b are bounded into one by ultrasonic welding, which is held on a holding member 23b. A positive electrode terminal 21 and a negative electrode terminal 22 are electrically connected to the holding members 23a and the 23b, respectively. A tip of the belt-shaped negative electrode terminal 22 is drawn outward from the container member 12. A tip of the belt-shaped positive electrode terminal 21 is located on the opposite side to the negative electrode terminal 22, and is drawn outward from the edge of the container member 12.

The secondary battery according to the present embodiment may include an electrode body 210 having a bipolar electrode structure shown in FIG. 19 as another aspect.

The electrode body 210 is constituted as follows: The electrode body 210 includes a first laminate in which a positive electrode active material layer 5b is formed on one side of a current collector 14 and a negative electrode active material layer 3b is formed on the other side thereof. The electrode body 210 includes a second laminate in which separator layers 13 are formed on both sides of the first laminate. The both separator layers 13 formed on the both sides of the first laminate satisfy the b/a of 0.0001 to 0.5.

In the electrode body 210, the multiple first laminates and the multiple second laminates are alternately laminated. As a result, the multiple first laminates and the multiple second laminate are connected in series. The number of the laminates can be appropriately changed depending on the shape and size of the battery.

In the laminates located at the both ends of the electrode body 210, for example, the active material layer (and the separator layer) are laminated only on one surface of the current collector 14, as shown in the upper part and the lower part of FIG. 19.

According to the electrode body 210 having the bipolar electrode structure, the positive electrode active material layer 5b, the separator layer 13, and the negative electrode active material layer 3b can be closely fitted to each other to make a thin structure. By laminating a number of the thin structures, accordingly, a secondary battery can be obtained which is compact, and has a high capacity and excellent life time performance, thermal stability and electrochemical stability.

FIG. 20 shows a cross-sectional schematic view showing schematically one example of bipolar secondary batteries. The secondary battery 50 shown in FIG. 20 includes the electrode body 210, which has been explained referring to FIG. 19. The electrode body 210 is housed in a container member 15 formed from a laminate film in which a metal layer is disposed between two resin films. A positive electrode terminal 21 provided on the current collector 14 located on the topmost end in FIG. 20 is electrically connected to the current collector 14. A negative electrode terminal 22 provided on the current collector 14 located on the lowermost end in FIG. 20 is electrically connected to the current collector 14. Although FIG. 20 does not show, the positive electrode terminal 21 and the negative electrode terminal 22 are drawn outward from the container member 15.

The secondary battery according to the second embodiment includes the electrode structure according to the first embodiment. Thus, the battery can inhibit the short circuit and the breakage of the current collecting tab, and can attain the excellent yield.

Third Embodiment

According to a third embodiment, a battery pack is provided. The battery pack includes a secondary battery according to the second embodiment, and a circuit unit to control the charge-and-discharge of the secondary battery.

The battery pack according to the present embodiment may include one secondary battery or multiple secondary batteries. The multiple secondary batteries, which can be included in the battery pack, can be electrically connected in series, in parallel, or in combination of in series and in parallel. The multiple secondary batteries are electrically connected to each other to form a battery module. The battery pack may include the multiple battery modules.

The battery pack may further include a protective circuit. The protective circuit controls the charge-and-discharge of the secondary battery. Alternatively, a circuit, included in a device (such as an electronic device or an automobile) using a battery pack as a power source, can be used as the protective circuit for the battery pack.

The battery pack may further include external power distribution terminal. The external power distribution terminal is used in order to output a current from the secondary battery and/or to input a current into the secondary battery; in other words, the current is supplied to the outside through the external power distribution terminal when the battery pack is used as the power source. When the battery pack is charged, the charge current (including a regenerative energy of a power of an automobile) can be supplied to the battery pack through the external power distribution terminal.

The circuit unit may be connected to the secondary battery before the battery pack is loaded on a vehicle such as an automobile or an electronic device. Alternatively, a circuit unit, included in a vehicle such as an automobile, may be connected to the secondary battery contained in the battery pack. The battery pack of the embodiment encompasses any mode.

Next, one example of the battery pack according to the present embodiment will be described in detail with reference to the drawings.

Figure 22:
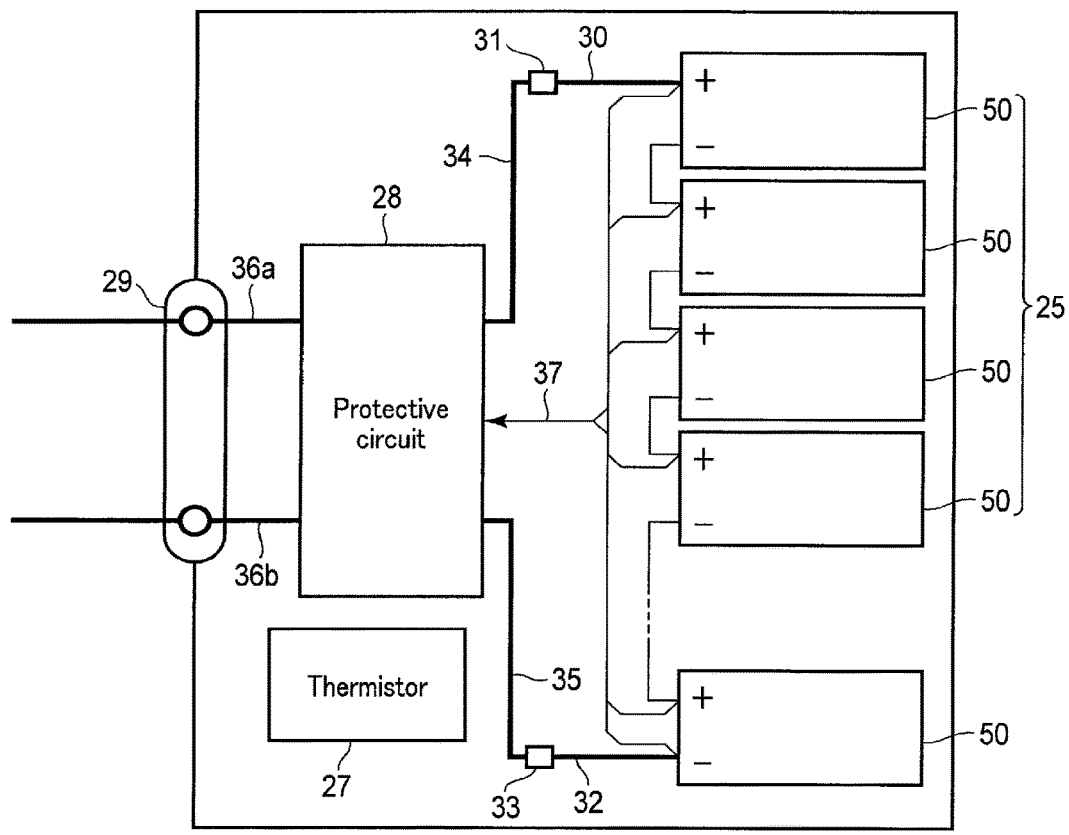
FIG. 22 is a block diagram showing an electric circuit of the battery pack shown in FIG. 21.

FIG. 21 is an exploded perspective view showing one example of the battery pack according to the present embodiment. FIG. 22 is a block diagram showing an electric circuit of the battery pack shown in FIG. 21.

The battery pack 20, shown in FIG. 21, includes the multiple secondary batteries 50, explained referring to FIG. 15 to FIG. 20.

The multiple secondary batteries 50 are laminated so that the negative electrode terminals 22 and the positive electrode terminals 21, which extend outward, are arranged in the same direction, and the laminate is fastened by a pressure-sensitive adhesive tape 24 to form a battery module 25. The secondary batteries 50 are electrically connected to each other in series, as shown in FIG. 22.

A printed wiring board 26 is disposed facing to a side surface from which the negative electrode terminals 22 and the positive electrode terminals 21 of the multiple secondary batteries 50 extend. A thermistor 27, a protective circuit 28, and an energizing terminal 29 to external devices, which are shown in FIG. 22, are loaded on the printed wiring board 26. An insulating plate (not shown) is attached to a surface facing the battery module 25 of the printed wiring board 26, in order to avoid unnecessary connection with wirings of the battery module 25.

A lead 30l on the positive electrode side is connected to a positive electrode terminal 21 of the secondary battery 50 located at the undermost layer of the battery module 25, and the tip thereof is inserted into a connector 31 on the positive electrode side of the printed wiring board 26, thereby electrically connecting them to each other. A lead 32 on the negative electrode side is connected to a negative electrode terminal 22 of the secondary battery 50 located at the uppermost layer of the battery module 25, and the tip thereof is inserted into a connector 33 on the negative electrode side of the printed wiring board 26, thereby electrically connecting them to each other. These connectors 31 and 33 are connected to the protective circuit 28 through the wirings 34 and 35, formed on the printed wiring board 26, respectively.

The thermistor 27 detects a temperature of each secondary battery 50, and transmits the detection signals to the protective circuit 28. The protective circuit 28 can block a wiring 36a on a plus side and a wiring 36b on a minus side between the protective circuit 28 and the energizing terminal 29 to the external device in a pre-determined condition. An example of the pre-determined condition is a case where a signal in which a temperature of the secondary battery 50 is a pre-determined temperature or higher is received from the thermistor 27. Alternatively, another example of the pre-determined condition is a case in which an over-charge, over-discharge, over-current, or the like of the secondary battery 50 is detected. The detection of the over-charge or the like is performed in each secondary battery 50 or the battery module 25. When each secondary battery 50 is detected, a battery voltage may be detected, or a positive electrode potential or a negative electrode potential may be detected. In the latter case, a lithium electrode to be used as a reference electrode is inserted into each secondary battery 50. In the battery pack 20, shown in FIG. 21 and FIG. 22, a wiring 37 is connected to each secondary battery 50, in order to detect the voltage, and the detection signals are transmitted to the protective circuit 28 through the wirings 37.

Among the four surfaces of the battery module 25, on three surfaces, excluding the side surface from which the positive electrode terminal 21 and the negative electrode terminal 22 protrude, are disposed protective sheets 38 formed from rubber or a resin.

The battery module 25 is housed in a storage container 39 together with the protective sheets 38 and the printed wiring board 26. The protective sheets 38 are disposed on both inside surfaces in a long-side direction of the storage container 39 and one inside surface in a short-side direction. The printed wiring board 26 is disposed on the other inside surface in the short-side direction of the storage container 39. The battery module 25 is located in a space surrounded by the protective sheets 38 and the printed wiring board 26. A lid 40 is attached to an upper surface of the storage container 39.

In order to fix the battery module 25, a heat-shrinkable tape may be used instead of the pressure-sensitive adhesive tape 24. In this case, the protective sheets are disposed on the both side surfaces of the battery module 25, which is wound with the heat-shrinkable tape, and then the heat-shrinkable tape is heat-shrunk to unite the battery module.

The battery pack 20 shown in FIG. 21 includes the multiple secondary batteries 50, but the battery pack 20 may include one secondary battery 50.

The embodiment of the battery pack appropriately varies depending on the use thereof. The battery pack according to the present embodiment is preferably used for an application required to have the excellent lifetime property when a large current is taken out. Specifically, for example, it is used as a power source for a digital camera, or a battery loaded on vehicles such as two-wheel to four-wheel hybrid electric automobiles, two-wheel to four-wheel electric automobiles, and assist bicycles, or stationary battery, or a rail way. In particular, it is preferably used as the battery loaded on the vehicle.

In the vehicles, such as automobiles, loading the battery pack of the present embodiment, the battery pack is configured to recover, for example, a regenerative energy of a power of the vehicle.

The battery pack according to the third embodiment includes the secondary battery of the second embodiment. For that reason, the short circuit and the breakage of the current collecting tab can be inhibited, and the excellent yield can be attained when the secondary battery is formed.

Fourth Embodiment

According to a fourth embodiment, a vehicle is provided. The vehicle includes a battery pack according to the third embodiment.

Figure 23:
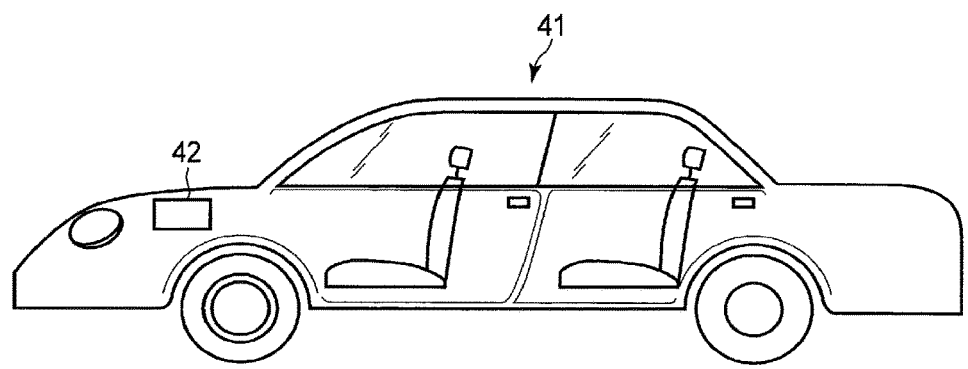
FIG. 23 is a cross-sectional view showing schematically one example of vehicle according to a fourth embodiment.

FIG. 23 shows an example of a vehicle which includes a battery pack according to the third embodiment.

The automobile 41 shown in FIG. 23 includes a battery pack 42 in its engine room in a front part of an automobile. The mounting position of the battery pack in the automobile is not limited to the engine room. For example, the battery pack may also be mounted in a rear part of an automobile or under seats.

EXAMPLES

Examples are explained below, but the embodiments are not limited to Examples described below.

Example 1

Production of Electrode Structure

An electrode structure as the negative electrode was produced as described below.

First, $Nb_2TiO_7$ having an average particle size of 5 μm was prepared as a negative electrode active material. As materials for a negative electrode active material layer, the negative electrode active material described above, an acetylene black powder and a graphite powder, which were conductive materials, and carboxymethyl cellulose ammonium salt powder and styrene-butadiene rubber, which were binders, were used. A ratio of the negative electrode materials added was adjusted to 93:1.5:3.5:1:1. The negative electrode materials were mixed in the following order. First, the carboxymethyl cellulose ammonium salt was dissolved in pure water, to which the acetylene black and then the graphite were dispersed, $Nb_2TiO_7$ was dispersed in the resulting mixture, and finally the styrene-butadiene rubber is mixed with it. The thus obtained slurry was coated on both sides of an aluminum foil, which was a current collector, having a thickness of 15 μm and an average crystal particle size of 30 μm. The coated slurry was dried in a drying furnace to form negative electrode active material layers on the both sides of the aluminum foil.

Subsequently, on an upper surface of the negative electrode active material layer formed on the both sides, a separator layer was formed which included an inorganic material, a solid electrolyte, and a binder. Titanium oxide, which was an inorganic material, $Li_7La_3Zr_2O_{12}$ particles having a primary particle size (average particle size) of 1 μm, which was a material for the solid electrolyte, and cellulose acetate and polyvinylidene fluoride, which were binders, were used. A ratio of the materials added to the separator layer was 49:49:1:1 by weight. The materials were mixed in the following order. First, the cellulose acetate was dissolved in N-methyl-2-pyrrolidone (NMP), in which titanium oxide and the $Li_7La_3Zr_2O_{12}$ particles were dispersed, and finally the polyvinylidene fluoride was mixed with it. The thus obtained slurry was coated on the negative electrode active material layer in a gravure method. After the slurry was coated, the laminate was transported to a drying furnace. Then, warm wind was blown on two edges, facing to each other, of the negative electrode active material layer, the negative electrode active material layer being coated with the slurry so that slurry was extended in a direction which the slurry covers the principal surface of the current collector, using a blowing nozzle manufactured by Parker Corporation Inc. (PHS9 type portable heated air blower), whereby the slurry coated on the negative electrode active material layer was extended to cover with the slurry an area of the current collector where the slurry was not coated. As described above, the slurry was extended in the in-plane direction, thereby forming a state in which a continuous layer of the slurry covered the surface of the negative electrode active material layer and a part of the surface of the current collector. Next, the laminate was sufficiently dried in the drying furnace to form separator layers on the both sides of the current collector. After that, the laminate was cut into an appropriate shape using a mold.

The obtained dried laminate was pressed to produce an electrode structure as the negative electrode. Here, the press pressure was controlled so that the electrode structure had a density of 2.6 g/cm³ as a whole.

In order to observe a state of the separator layer slanted in the current collecting tab part of the produced electrode structure, a measurement according to SEM was performed in the method explained in the first embodiment. As a result, the distance a was 10000 μm, and the distance b was 1 μm. The ratio b/a was, accordingly, 0.0001.

The observation according to SEM was also performed as for the end part on the opposite side of the current collecting tab of the electrode structure, and it was found the end part had a structure shown in FIG. 6. The end part had a distance c of 10 μm and a distance d of 7 μm, and thus a ratio d/c of 0.7.

<Production of Laminate Cell>

A laminate cell was produced in a method described below.

First, a positive electrode, which is a counter electrode of the electrode structure described above, was produced as described below.

As positive electrode active material particles, a powder of lithium nickel cobalt manganese composite oxide ($LiNi_{0.5}Co_{0.2}Mn_{0.3}O_2$: NCM) having an average particle size Da of 4 μm ($D_{10}$=2 μm, $D_{50}$=4 μm (=Da), $D_{90}$=10 μm, a range of particle sizes: 0.5 μm to 50 μm) was prepared. As materials for the positive electrode active material layer, the positive electrode active material described above, a graphite powder (average particle size of 6 μm), which was a conductive agent, and polyvinylidene fluoride (PVdF), which was a binder, were used.

The prepared materials as above were mixed in a mass ratio of NCM:graphite:PVdF=100:5:3 in the following order. First, PVdF was dissolved in N-methyl-2-pyrrolidone (NMP), to which graphite was added and dispersed therein to obtain a dispersion. Next, NCM powder was mixed with and dispersed in the dispersion to obtain a mixture. After that, the solid concentration of the mixture was adjusted to 60% using NMP as a solvent, thereby obtaining a slurry for a positive electrode material.

The thus obtained slurry was coated on both sides of an aluminum foil, which was a positive electrode current collector, having a thickness of 15 μm and having an average crystal particle size of 30 μm.

Next, the coating films were dried to obtain a laminate. Then, the laminate was pressed to obtain a positive electrode. The positive electrode current collector included positive electrode tab on which the positive electrode active material layer was not supported. The positive electrode active material layer had a density of 3.0 g/cm³.

The produced electrode structure as the negative electrode and positive electrode as the counter electrode were cut into a size of 10 cm×5 cm except for the current collector as the current collecting tab so as to leave the current collector. Ten of the cut negative electrodes and ten of the cut positive electrodes, the total number of electrodes being 20, were stacked. At that time, they were stacked so that the current collectors of the negative electrodes and the positive electrodes were placed in opposite direction to each other. Each of the multiple negative electrode current collectors and the multiple positive electrode current collectors were bundled and were welded to external terminals with ultrasonic welding. The obtained electrode group was housed in a laminate cup, and the circumference of the cup was heat-sealed leaving one spot as an opening. The resulting laminate cell was dried at 100° C. over 24 hours.

Next, an electrolytic solution was prepared as described below.

In a solvent in which ethylene carbonate and diethyl carbonate were mixed in a volume ratio of 1:2, lithium hexafluorophosphate ($LiPF_6$) was dissolved at concentration of 1 mol/L in a glove box to prepare an electrolytic solution.

Into the laminate cell was poured into 25 mL of the electrolytic solution, whereby the electrode group was impregnated with the electrolytic solution. After that, the opening of the laminate cell was heat-sealed to produce a nonaqueous electrolyte secondary battery according to Example 1, having the structure shown in FIG. 18.

<Evaluation of Yield>

According to the same method as described above, 100 of the nonaqueous electrolyte secondary batteries according to Example 1 were produced. A resistance of each of the 100 batteries was measured, and a battery having a resistance of 1 MΩ or more was defined as a superior article and a battery having a resistance of less than 1 MΩ was defined as an inferior article, from which a yield was counted.

As a result, the nonaqueous electrolyte battery according to Example 1 had a yield of 81. The results are summarized in Table 1 below. In Table 1, results obtained in Examples 2 to 20 and Comparative Examples 1 to 9 described below are also shown.

Examples 2 to 16 and Comparative Examples 1 to 5

A nonaqueous electrolyte battery was produced in the same manner as in Example 1 except that the ratio b/a, the d/c, and the structure of the end part opposite to the current collecting tab part were changed to those shown in Table 1. A yield of the nonaqueous electrolyte battery was evaluated.

The column "Structure on Opposite Side" in Table 1 shows that which shape shown in the drawing the structure of the end part on the opposite side of the current collecting tab part had among the shapes explained in the embodiment using the drawings, in the electrode structure produced as the negative electrode.

In addition, in Table 1, the term "no blowing" refers that the slurry coated on the active material layer was not subjected to the blowing step when the electrode structure was produced, and thus the separator layer did not cover the end face of the active material layer. In the electrode structures according to Comparative Examples 1 to 5, the end part on the opposite side of the current collecting tab part was not subjected to the blowing step, and thus the end face of the active material layer was not covered with the separator layer in the end part on the opposite side of the current collecting tab part of the electrode structure. In Table 1, the term "no cover" refers that the end face of the active material layer was not covered with the separator layer in the end part on the opposite side of the current collecting tab part.

The ratio b/a of the electrode structure in each Example was controlled by changing the air flow (L/minute) from the blowing nozzle, the time to send the wind (second), and the distance (cm) between the blowing nozzle and the slurry, as shown in Table 2. The ratio d/c of the electrode structure of each Example was controlled by changing the air flow (L/minute) from the blowing nozzle, the time to send the wind (second), and the distance between the blowing nozzle and the slurry distance (cm), as shown in Table 3. In Table 2 and Table 3, the column "Time" refers to the time to apply the air using the blowing nozzle, and the column "Distance" refers to the distance between the blowing nozzle and the slurry.

Example 17

A bipolar battery was produced as described below.

A negative electrode active material layer was formed on one side of the current collector according to the method described in Example 1. Next, an LLZ ($Li_7La_3Zr_2O_{12}$) powder as an electrolyte material having an average particle size Da of 0.7 μm, and a PVdF (polyvinylidene fluoride) powder as a binder were prepared.

The materials prepared as above were mixed in a mass ratio of LLZ:PVdF=100:2 in the following order. First, the PVdF powder was dissolved in N-methyl-2-pyrrolidone (NMP) followed by LLZ was dispersed in the NMP dispersion to obtain a slurry of an electrolyte material. The obtained slurry was coated on the negative electrode active material layer, which had been previously formed, and the resulting laminate was transported to a drying furnace. Then, warm wind was blown on two edges, facing to each other, of the negative electrode active material layer, the negative electrode active material layer being coated with the slurry so that slurry was extended in a direction covering the principal surface of the current collector, using a blowing nozzle manufactured by Parker Corporation Inc. (PHS9 type portable heated air blower), whereby the slurry coated on the negative electrode active material layer was extended to cover with the slurry a part of the current collector where the slurry was not coated. As described above, the slurry was extended in the in-plane direction, thereby forming a state in which a continuous layer of the slurry covered the surface of the negative electrode active material layer and a part of the surface of the current collector. Next, the laminate was sufficiently dried in the drying furnace to form the negative electrode active material layer and the separator layer on the one side of the current collector.

Subsequently, using the materials for the positive electrode active material layer, described in Example 1, a positive electrode active material layer was formed on the other side of the current collector. The same separator layer formed on the negative electrode active material layer was also formed on the positive electrode active material layer. As described above, an electrode structure was produced in which the negative electrode active material layer and the separator layer were formed in this order on the one side of the current collector and the positive electrode active material layer and the separator layer were formed in this order on the other side of the current collector.

In order to observe a state of the separator layer slanted in the current collecting tab part of the produced electrode structure, a measurement according to SEM was performed in the method explained in the first embodiment. As a result, the distance a was 10000 μm, and the distance b was 1 μm. The ratio b/a was, accordingly, 0.0001.

The observation according to SEM was also performed as for the end part on the opposite side of the current collecting tab of the electrode structure, and it was found the end part had a structure shown in FIG. 6. The end part had a distance c of 10 μm and a distance d of 7 μm, and thus a ratio d/c of 0.7.

An electrode unit was produced in the same manner as in the electrode structure described above, except that the separator layer was not formed. Specifically, in the electrode unit, a negative electrode active material layer was formed on one side of the current collector and a positive electrode active material layer was formed on the other side of the current electrode.

An electrode body, shown in FIG. 19, was produced by staking the 10 electrode structures and the 10 electrode units alternately. The obtained electrode body was housed in a container material formed of a laminate film in which a metal layer was disposed between two resin films to produce a bipolar battery.

<Evaluation of Yield>

According to the same method as described above, 100 of the bipolar batteries according to Example 17 were produced. A resistance of each of the 100 batteries was measured, and a battery having a resistance of 1 MΩ or more was defined as a superior article and a battery having a resistance of less than 1 MΩ was defined as an inferior article, from which a yield was counted.

As a result, the bipolar battery according to Example 17 had a yield of 98. The results are summarized in Table 1 below.

Examples 18 to 20 and Comparative Examples 6 to 9

A bipolar battery was produced in the same manner as in Example 17 except that the ratio b/a, the d/c, and the structure of the end part on the opposite side of the current collecting tab part were changed to those shown in Table 1. A yield of each of the bipolar battery was evaluated.

TABLE 1

|  | Kind of Battery | Ratio b/a | Ratio d/c | Structure on Opposite Side | Yield |
|---|---|---|---|---|---|
| Example 1 | nonaqueous electrolyte secondary battery | 0.0001 | 0.7 | FIG. 6 | 81 |
| Example 2 | nonaqueous electrolyte secondary battery | 0.0005 | 0.7 | FIG. 6 | 84 |
| Example 3 | nonaqueous electrolyte secondary battery | 0.001 | 0.7 | FIG. 6 | 88 |
| Example 4 | nonaqueous electrolyte secondary battery | 0.005 | 0.7 | FIG. 6 | 89 |
| Example 5 | nonaqueous electrolyte secondary battery | 0.01 | 0.7 | FIG. 6 | 90 |
| Example 6 | nonaqueous electrolyte secondary battery | 0.05 | 0.7 | FIG. 6 | 89 |
| Example 7 | nonaqueous electrolyte secondary battery | 0.1 | 0.7 | FIG. 6 | 88 |
| Example 8 | nonaqueous electrolyte secondary battery | 0.5 | 0.7 | FIG. 6 | 80 |
| Example 9 | nonaqueous electrolyte secondary battery | 0.0001 | 0.7 | FIG. 5 | 94 |
| Example 10 | nonaqueous electrolyte secondary battery | 0.0005 | 0.7 | FIG. 5 | 96 |
| Example 11 | nonaqueous electrolyte secondary battery | 0.001 | 0.7 | FIG. 5 | 97 |
| Example 12 | nonaqueous electrolyte secondary battery | 0.005 | 0.7 | FIG. 5 | 98 |
| Example 13 | nonaqueous electrolyte secondary battery | 0.01 | 0.7 | FIG. 5 | 99 |
| Example 14 | nonaqueous electrolyte secondary battery | 0.05 | 0.7 | FIG. 5 | 100 |
| Example 15 | nonaqueous electrolyte secondary battery | 0.1 | 0.7 | FIG. 5 | 99 |
| Example 16 | nonaqueous electrolyte secondary battery | 0.5 | 0.7 | FIG. 5 | 93 |
| Example 17 | bipolar secondary battery | 0.0001 | 0.7 | FIG. 6 | 98 |
| Example 18 | bipolar secondary battery | 0.01 | 0.7 | FIG. 6 | 100 |
| Example 19 | bipolar secondary battery | 0.1 | 0.7 | FIG. 6 | 99 |
| Example 20 | bipolar secondary battery | 0.5 | 0.7 | FIG. 6 | 96 |
| Comparative Example 1 | nonaqueous electrolyte secondary battery | no blowing | no blowing | no cover | 16 |
| Comparative Example 2 | nonaqueous electrolyte secondary battery | 0.55 | no blowing | no cover | 70 |
| Comparative Example 3 | nonaqueous electrolyte secondary battery | 0.6 | no blowing | no cover | 67 |
| Comparative Example 4 | nonaqueous electrolyte secondary battery | 0.7 | no blowing | no cover | 63 |
| Comparative Example 5 | nonaqueous electrolyte secondary battery | 0.9 | no blowing | no cover | 56 |
| Comparative Example 6 | bipolar secondary battery | no blowing | no blowing | no cover | 12 |
| Comparative Example 7 | bipolar secondary battery | 0.55 | no blowing | no cover | 68 |
| Comparative Example 8 | bipolar secondary battery | 0.7 | no blowing | no cover | 59 |
| Comparative Example 9 | bipolar secondary battery | 0.9 | no blowing | no cover | 49 |

TABLE 2

|  | Ratio b/a | Air Flow (L/min) | Time (sec) | Distance (cm) |
|---|---|---|---|---|
| Example 1 | 0.0001 | 550 | 10 | 5 |
| Example 2 | 0.0005 | 470 | 9 | 5 |
| Example 3 | 0.0010 | 350 | 6 | 5 |
| Example 4 | 0.0050 | 310 | 6 | 5 |
| Example 5 | 0.0100 | 250 | 6 | 5 |
| Example 6 | 0.0500 | 220 | 6 | 5 |
| Example 7 | 0.1000 | 180 | 6 | 5 |
| Example 8 | 0.5000 | 160 | 6 | 5 |
| Example 9 | 0.0001 | 550 | 10 | 5 |
| Example 10 | 0.0005 | 470 | 9 | 5 |
| Example 11 | 0.0010 | 350 | 6 | 5 |
| Example 12 | 0.0050 | 310 | 6 | 5 |
| Example 13 | 0.0100 | 250 | 6 | 5 |
| Example 14 | 0.0500 | 220 | 6 | 5 |
| Example 15 | 0.1000 | 180 | 6 | 5 |
| Example 16 | 0.5000 | 160 | 6 | 5 |
| Example 17 | 0.0001 | 550 | 10 | 5 |
| Example 18 | 0.01 | 250 | 6 | 5 |
| Example 19 | 0.1 | 180 | 6 | 5 |
| Example 20 | 0.5 | 160 | 6 | 5 |
| Comparative Example 1 | no blowing | 0 | 0 | — |
| Comparative Example 2 | 0.55 | 160 | 5 | 8 |
| Comparative Example 3 | 0.6 | 160 | 5 | 10 |
| Comparative Example 4 | 0.7 | 160 | 5 | 15 |
| Comparative Example 5 | 0.9 | 160 | 5 | 20 |
| Comparative Example 6 | no blowing | 0 | 0 | — |
| Comparative Example 7 | 0.55 | 160 | 5 | 8 |
| Comparative Example 8 | 0.7 | 160 | 5 | 15 |
| Comparative Example 9 | 0.9 | 160 | 5 | 20 |

TABLE 3

|  | Ratio d/c | Air Flow (L/min) | Time (sec) | Distance (cm) |
|---|---|---|---|---|
| Example 1 | 0.7 | 160 | 2 | 5 |
| Example 2 | 0.7 | 160 | 2 | 5 |
| Example 3 | 0.7 | 160 | 2 | 5 |
| Example 4 | 0.7 | 160 | 2 | 5 |
| Example 5 | 0.7 | 160 | 2 | 5 |
| Example 6 | 0.7 | 160 | 2 | 5 |
| Example 7 | 0.7 | 160 | 2 | 5 |
| Example 8 | 0.7 | 160 | 2 | 5 |
| Example 9 | 0.7 | 160 | 2 | 5 |
| Example 10 | 0.7 | 160 | 2 | 5 |
| Example 11 | 0.7 | 160 | 2 | 5 |
| Example 12 | 0.7 | 160 | 2 | 5 |
| Example 13 | 0.7 | 160 | 2 | 5 |
| Example 14 | 0.7 | 160 | 2 | 5 |

TABLE 3-continued

|  | Ratio d/c | Air Flow (L/min) | Time (sec) | Distance (cm) |
|---|---|---|---|---|
| Example 15 | 0.7 | 160 | 2 | 5 |
| Example 16 | 0.7 | 160 | 2 | 5 |
| Example 17 | 0.7 | 160 | 2 | 5 |
| Example 18 | 0.7 | 160 | 2 | 5 |
| Example 19 | 0.7 | 160 | 2 | 5 |
| Example 20 | 0.7 | 160 | 2 | 5 |
| Comparative Example 1 | no blowing | 0 | 0 | — |
| Comparative Example 2 | no blowing | 0 | 0 | — |
| Comparative Example 3 | no blowing | 0 | 0 | — |
| Comparative Example 4 | no blowing | 0 | 0 | — |
| Comparative Example 5 | no blowing | 0 | 0 | — |
| Comparative Example 6 | no blowing | 0 | 0 | — |
| Comparative Example 7 | no blowing | 0 | 0 | — |
| Comparative Example 8 | no blowing | 0 | 0 | — |
| Comparative Example 9 | no blowing | 0 | 0 | — |

From Table 1, it is found that when the ratio b/a was from 0.0001 to 0.5, the remarkably excellent yield could be attained compared to the case in which the end face active material layer was not covered because the blowing step was performed, regardless of the kind of the battery. It is also found that when the ratio b/a is from 0.001 to 0.1, the excellent yield, i.e., the inhibition of the increased resistance, caused by the short circuit, and the breakage of the current collector could be attained.

In addition, it is found that when the structures of the current collecting tab part of the electrode structure and the end part on the opposite side thereof had the structure shown in FIG. 5, the more excellent yield could be attained compared to the case in which they had the structure shown in FIG. 6.

The batteries according to Comparative Example 1 and Comparative Example 6 in which the blowing step was not completely performed had the remarkably low yield, because the end face of the active material layer was not totally covered.

According to at least one embodiment described above, the electrode structure includes a current collector, a separator layer, and an active material layer including a main surface and a first end face other than the main surface. The active material layer covers a first part of at least one surface of the current collector. The separator layer covers the main surface of the active material layer, at least a part of the first end face and second part of the at least one surface of the current collector. The electrode structure satisfies a ratio b/a falling within a range of 0.0001 to 0.5, where a is a distance from the first end face of the active material layer to the first end part of the separator layer, and b is a distance in a direction parallel to the at least one surface of the current collector, which is from a first edge of the active material layer to a surface of the separator layer, the main surface of the active material layer and the first end face of the active material layer intersect at the first edge of the active material layer. Thus, the short circuit and the breakage of the current collector can be inhibited, and the excellent yield can be attained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electrode structure comprising:
a current collector;
an active material layer comprising a main surface and a first end face other than the main surface; and
a separator layer, wherein
the active material layer covers a first part of at least one surface of the current collector,
the separator layer covers the main surface of the active material layer, at least a part of the first end face and a second part of the at least one surface of the current collector, and the separator layer comprises a first end part which is brought into contact with the second part of the at least one surface of the current collector, and
wherein the electrode structure satisfies a ratio b/a falling within a range of 0.0001 to 0.5,
where a is a distance from the first end face of the active material layer to the first end part of the separator layer, and
b is a distance in a direction parallel to the at least one surface of the current collector, which is from a first edge of the active material layer to a surface of the separator layer, the main surface of the active material layer and the first end face of the active material layer intersect at the first edge of the active material layer.

2. The electrode structure according to claim 1, wherein the ratio b/a falls within a range of 0.001 to 0.1.

3. The electrode structure according to claim 1, wherein the separator layer covers a whole surface of the first end face of the active material layer.

4. The electrode structure according to claim 1, wherein the active material layer comprises a second end face opposed to the first end face,
the separator layer further covers at least a part of the second end face and a third part of the at least one surface of the current collector, and
wherein the electrode structure satisfies a ratio d/c falling within a range of 0.6 to 1,
where c is a distance in a direction parallel to the at least one surface of the current collector, which is from a second edge of the active material layer to the surface of the separator layer, the at least one surface of the current collector and the second end face of the active material layer intersect at the second edge of the active material layer, and
d is a distance in a direction parallel to the at least one surface of the current collector, which is from a third edge to the surface of the separator layer, the main surface of the active material layer and the second end face of the active material layer intersect at the third edge of the active material layer.

5. The electrode structure according to claim 4, wherein the ratio d/c falls within a range of 0.7 to 0.9.

6. The electrode structure according to claim 4, wherein the separator layer covers a whole second end face of the active material layer.

7. A secondary battery comprising:
a positive electrode;
a negative electrode comprising the electrode structure according to claim 1; and
an electrolyte.

8. A battery pack comprising the secondary battery according to claim 7.

9. The battery pack according to claim 8, further comprising an external power distribution terminal and a protective circuit.

10. The battery pack according to claim 8, comprising a plural of the secondary batteries, wherein the secondary batteries are electrically connected in series, in parallel, or in combination of in series and in parallel.

11. A vehicle comprising the battery pack according to claim 8.

12. The vehicle according to claim 11, wherein the battery pack is configured to recover a regenerative energy of a power of the vehicle.

* * * * *